United States Patent
Kim et al.

(10) Patent No.: US 10,462,777 B2
(45) Date of Patent: Oct. 29, 2019

(54) METHOD AND APPARATUS FOR MONITORING DOWNLINK CONTROL CHANNEL IN WIRELESS COMMUNICATION SYSTEM

(71) Applicant: Samsung Electronics Co., Ltd., Suwon-si, Gyeonggi-do (KR)

(72) Inventors: Taehyoung Kim, Seoul (KR); Yongjun Kwak, Yongin-si (KR); Donghan Kim, Osan-si (KR); Juho Lee, Suwon-si (KR); Youngbum Kim, Seoul (KR); Seunghoon Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/841,949

(22) Filed: Dec. 14, 2017

(65) Prior Publication Data

US 2018/0167919 A1 Jun. 14, 2018

(30) Foreign Application Priority Data

Dec. 14, 2016 (KR) .......................... 10-2016-0170775

(51) Int. Cl.
*H04W 72/04* (2009.01)
*H04L 1/00* (2006.01)
(Continued)

(52) U.S. Cl.
CPC ......... *H04W 72/042* (2013.01); *H04L 1/0039* (2013.01); *H04L 5/0053* (2013.01);
(Continued)

(58) Field of Classification Search
None
See application file for complete search history.

(56) References Cited

U.S. PATENT DOCUMENTS

| | | | |
|---|---|---|---|
| 2016/0014812 A1* | 1/2016 | Park | H04L 5/0048 |
| | | | 370/329 |
| 2016/0295560 A1 | 10/2016 | Chen et al. | |
| 2016/0337880 A1* | 11/2016 | Nogami | H04W 24/02 |

OTHER PUBLICATIONS

Huawei et al: "DMRS sequences for ePDCCH", 3GPP Draft; R1-120870. 3rd Generation Partnership Project (3GPP), Mobile Competence Centre; 650, Route Des Lucioles; F-06921 Sophia-Antipolis Cedex; France, vol. RAN WG1. no. Dresden, Germany; Feb. 6, 2012-Feb. 10, 2012, XP050563409.

* cited by examiner

*Primary Examiner* — James P Duffy
(74) *Attorney, Agent, or Firm* — Jefferson IP Law, LLP

(57) ABSTRACT

The present disclosure relates to a communication method and a system for converging a 5th-generation (5G) communication system for supporting higher data rates beyond a 4th-generation (4G) system with a technology for Internet of Things (IoT) is provided. The present disclosure may be applied to intelligent services based on the 5G communication technology and the IoT-related technology, such as smart home, smart building, smart city, smart car, connected car, health care, digital education, smart retail, security and safety services. A decoding method for a terminal is provided. The method includes receiving a downlink control channel, receiving a reference signal in respective physical resource block (PRB) pairs, performing a correlation operation between a first sequence for the received reference signal and a second sequence for a predetermined reference signal for decoding the downlink control channel, and performing decoding of a search space for the downlink control channel in the PRB pair determined based on a result of the correlation operation.

18 Claims, 14 Drawing Sheets

(51) Int. Cl.
*H04W 16/14* (2009.01)
*H04W 24/10* (2009.01)
*H04W 52/02* (2009.01)
*H04L 5/00* (2006.01)

(52) U.S. Cl.
CPC ........... *H04W 16/14* (2013.01); *H04W 24/10* (2013.01); *H04W 52/0229* (2013.01); *H04L 5/0051* (2013.01); *Y02D 70/00* (2018.01); *Y02D 70/10* (2018.01); *Y02D 70/12* (2018.01); *Y02D 70/126* (2018.01); *Y02D 70/1262* (2018.01); *Y02D 70/1264* (2018.01); *Y02D 70/21* (2018.01)

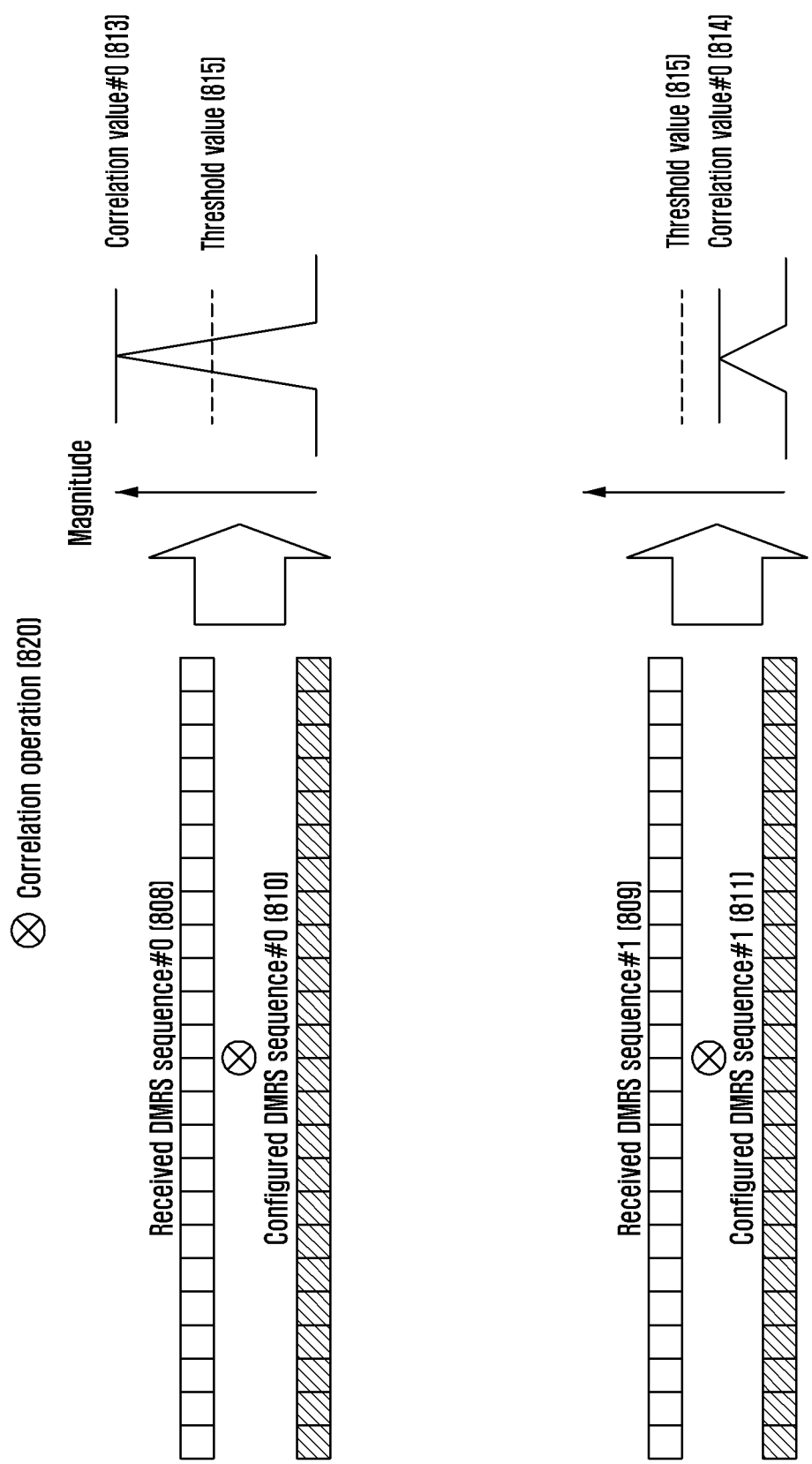

METHOD AND APPARATUS FOR MONITORING DOWNLINK CONTROL CHANNEL IN WIRELESS COMMUNICATION SYSTEM

CROSS-REFERENCE TO RELATED APPLICATION(S)

This application claims the benefit under 35 U.S.C. § 119(a) of a Korean patent application filed on Dec. 14, 2016 in the Korean Intellectual Property Office and assigned Serial number 10-2016-0170775, the entire disclosure of which is hereby incorporated by reference.

TECHNICAL FIELD

The present disclosure relates to a wireless communication system. More particularly, the present disclosure relates to a method and an apparatus for monitoring a downlink control channel to reduce power consumption of a terminal.

BACKGROUND

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency millimeter wave (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud radio access network (RAN) as the above-described Big Data processing technology may also be considered to be as an example of convergence between the 5G technology and the IoT technology.

In order to support transmission of downlink and uplink transmission channels in a wireless communication system, related downlink control information (DCI) is necessary. In LTE in the related art, DCI is transmitted through a physical downlink control channel (PDCCH) that is a separate physical channel for transmitting the DCI, and the PDCCH is transmitted for each subframe over the whole system band.

Since one PDCCH carries one DCI message and a plurality of terminals may be simultaneously scheduled in downlink and uplink, transmission through a plurality of PDCCHs may be simultaneously performed in each cell. As a reference signal (RS) for decoding the PDCCH, a cell-specific reference signal (CRS) that is a cell-common reference signal is used. The CRS is an always-on signal transmitted for each subframe over the full band, and scrambling and resource mapping differ in accordance with a cell identity (ID). All terminals monitoring the PDCCH estimate channels using the CRS, and perform decoding of the PDCCH.

The CRS is a reference signal that is transmitted to all terminals in a broadcasting method, and thus, UE-specific beamforming is unable to be used. Accordingly, a multi-antenna transmission technique for the PDCCH of the LTE is limited to the open-loop transmission diversity.

As various technologies, such as carrier aggregation (CA) and coordinated multipoint (COMP), are supported in the LTE in the related art, it becomes difficult to secure sufficient transmission capacity for transmitting a downlink control signal only through the existing PDCCH being used.

Accordingly, in LTE Release 11, an enhanced PDCCH (EPDCCH) has been added as a physical channel for transmitting the DCI. The EPDCCH has been designed in a direction to satisfy the requirements, such as control channel transmission capacity increase, frequency-axis adjacent cell interference control, frequency-selective scheduling, and coexistence with the existing LTE terminals.

Since a demodulation reference signal (DMRS) that is a UE-specific reference signal is used as a reference signal for decoding the EPDCCH, the UE-specific beamforming can be used for the EPDCCH. Accordingly, the EPDCCH supports the multi-antenna transmission technique using precoding, and supports a transmission diversity technique using precoder cycling and a multiuser MIMO (MU-MIMO) transmission technique in accordance with a resource allocation method.

The downlink control channel as described above may have various formats, and the format of the downlink control channel is not pre-known to a terminal. Further, since the downlink control channel can be transmitted from a certain resource in a set of time/frequency resources defined as a search space, an accurate time/frequency resource for transmitting the downlink control channel is not pre-known to the terminal. Accordingly, decoding of the downlink control channel in the terminal is based on blind decoding.

For example, the blind decoding means that a terminal performs decoding of the downlink control channel with respect to combinations of all possible downlink control channel formats and all possible time/frequency resources in a given search space.

In LTE, the downlink control channel may be transmitted at each subframe interval, and thus, the terminal should perform monitoring of the downlink control channel for each subframe, that is, blind decoding. As an example, with respect to an LTE PDCCH, the terminal may perform blind decoding of the downlink control channel maximally 44 times for one component carrier.

The blind decoding as described above imposes a great burden from the viewpoint of power consumption of a terminal. Accordingly, there is a need for a new technique for monitoring a downlink control channel in order to reduce power consumption of the terminal due to the blind decoding of the downlink control channel.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a technique for monitoring a downlink control channel in order to reduce power consumption of a terminal in a wireless communication system.

According to the technique for monitoring a downlink control channel proposed by the present disclosure, blind decoding is not performed with respect to time/frequency resources whereby the downlink control channel is not actually transmitted based on a correlation value for a reference signal (RS) sequence, and thus, the number of times of blind decoding is greatly reduced to minimize the power consumption of the terminal.

In accordance with an aspect of the present disclosure, a decoding method for a terminal is provided. The method includes receiving a downlink control channel, receiving a reference signal in respective physical resource block (PRB) pairs, performing a correlation operation between a first sequence for the received reference signal and a second sequence for a predetermined reference signal for decoding the downlink control channel, and performing decoding of a search space for the downlink control channel in the PRB pair determined based on a result of the correlation operation.

In this case, the second sequence may be related to a terminal-specific sequence configured through higher layer signaling. The reference signal for decoding the downlink control channel may have the same pattern as that of a reference signal for decoding data transmitted from a base station.

Performing the decoding may include each of the PRB pairs comparing a correlation value in accordance with the correlation operation with a first threshold value, and the first PRB pair performing blind decoding for the search space existing in the first PRB pair if the correlation value is greater than the first threshold value in accordance with the result of the comparison.

Performing the decoding may further include the second PRB pair reducing the first threshold value for a predetermined value if the correlation value is equal to or less than the first threshold value in accordance with the result of the comparison, the second PRB pair comparing the correlation value with the reduced first threshold value if the reduced first threshold value is greater than the minimum threshold value, and performing the blind decoding for the search space existing in the second PRB pair if the correlation value is greater than the reduced first threshold value in accordance with the result of the comparison.

The decoding method for the terminal may further include measuring a channel state of a downlink, comparing a state value in accordance with the result of the measurement with a second threshold value, and configuring the first threshold value in accordance with the result of the comparison.

The decoding method for the terminal may further include confirming a battery state of the terminal, comparing a residual battery amount in accordance with the result of the confirmation with a third threshold value, and configuring the first threshold value in accordance with the result of the comparison.

Performing the correlation operation may include generating a PRB pair set by bundling the plural PRB pairs, and performing a correlation operation between the first sequence for the received reference signal and the second sequence in the PRB pair set.

The reference signal may be a demodulation reference signal (DMRS). The downlink control channel may be an enhanced physical downlink control channel (EPDCCH).

In accordance with another aspect of the present disclosure, a terminal for performing decoding is provided. The terminal includes a transceiver configured to transmit and receive signals, and at least one processor configured to receive a downlink control channel, control respective physical resource block (PRB) pairs to receive a reference signal, perform a correlation operation between a first sequence for the received reference signal and a second sequence for a predetermined reference signal for decoding the downlink control channel, and control the PRB pair determined based on a result of the correlation operation to perform decoding of a search space for the downlink control channel.

According to the aspects of the present disclosure, by providing the low-power monitoring technique for the downlink control channel in the wireless cellular communication system, the number of times of blind decoding for the downlink control channel can be reduced, and thus, the power consumption of the terminal can be reduced.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 8A and 8B are diagrams illustrating a blind search method according to an embodiment of the present disclosure;

Throughout the drawings, like reference numerals will be understood to refer to like parts, components, and structures.

DETAILED DESCRIPTION

Figure 1:
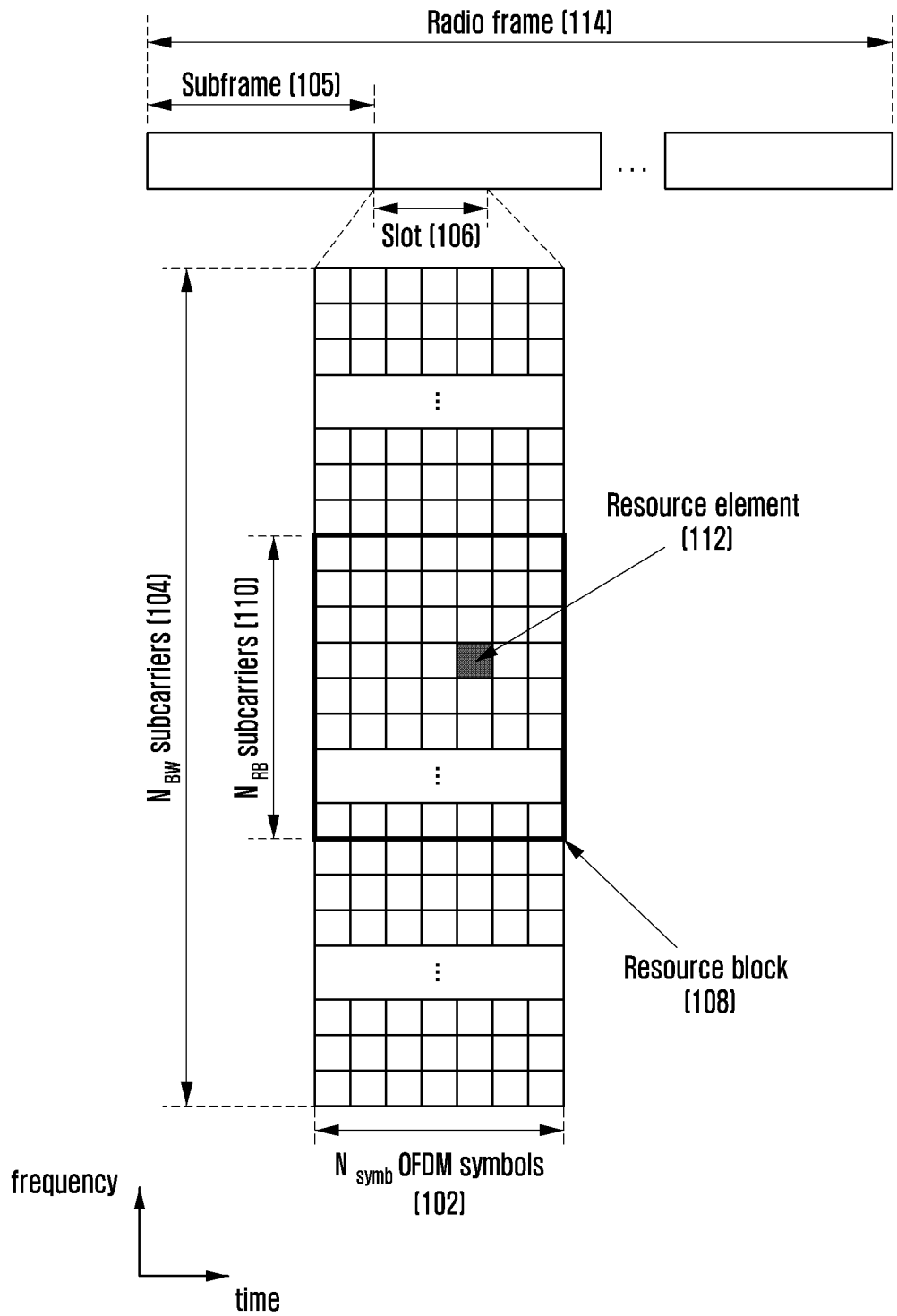
FIG. 1 is a diagram illustrating a basic structure of a time-frequency region in a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In embodiments of the present disclosure, descriptions of technical contents which are well known in the art to which the present disclosure pertains and are not directly related to the present disclosure will be omitted. This is to transfer the subject matter of the present disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the present disclosure and methods for achieving the aspects and features will be apparent by referring to the embodiments to be described with reference to the accompanying drawings. However, the present disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

In addition, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit", as used in an embodiment, means, but is not limited to, a software or hardware component, such as field programmable gate array (FPGA) or application-specific integrated circuit (ASIC), which performs certain tasks. However, "~unit" does not mean to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more central processing units (CPUs) in a device or a security multimedia card.

Hereinafter, embodiments of the present disclosure will be described with reference to the accompanying drawings. In describing the present disclosure, a detailed description of related known functions or configurations will be omitted if it is determined that it obscures the disclosure in unnecessary detail. Further, all terms used in the description are general terms that are widely used based on their functions in the present disclosure, but may differ depending on intentions of a person skilled in the art to which the present disclosure belongs, customs, or appearance of new technology. Accordingly, they should be defined based on the contents of the whole description of the present disclosure.

A wireless communication system has escaped from an initial voice-oriented service providing system, and has been developed as a broadband wireless communication system that provides high-speed and high-quality packet data services in accordance with the communication standards, such as high speed packet access (HSPA) of $3^{rd}$ generation partnership project (3GPP), long term evolution (LTE) or evolved universal terrestrial radio access (E-UTRA), LTE-advanced (LTE-A), high rate packet data (HRPD) of 3GPP2, ultra-mobile broadband (UMB), and 802.16e of IEEE. Further, for the fifth generation (5G) wireless communication system, 5G or new radio (NR) communication standards have been made.

In the LTE system that is a representative example of the broadband wireless communication system, an orthogonal frequency division multiplexing (OFDM) method is adapted for a downlink (DL), and a single carrier frequency division multiple access (SC-FDMA) method is adapted for an uplink (UL). The uplink means a radio link through which a terminal (user equipment (UE) or mobile station (MS)) transmits data or a control signal to a base station (BS or evolved node B (eNode B)), and the downlink means a radio link through which the base station transmits data or a control signal to the terminal. In general, the multiple access method as described above separates data and control information from each other for each user by allocating and operating time-frequency resources on which the data or the control information is carried for each user so that the resources do not overlap each other, that is, so that the orthogonality is realized.

Hereinafter, the frame structure of an LTE or LTE-A system will be described with reference to the drawings.

FIG. 1 is a diagram illustrating a basic structure of a time-frequency region in a wireless communication system according to an embodiment of the present disclosure.

Referring to FIG. 1, a horizontal axis represents a time domain, and a vertical axis represents a frequency domain. In the time domain, the minimum transmission unit is an orthogonal frequency-division multiplexing (OFDM) symbol, and a number of OFDM (Nsymb OFDM) symbols 102 are gathered to constitute one slot 106, and two slots are gathered to constitute one subframe 105. The length of the slot is 0.5 ms, and the length of the subframe is 0.1 ms. Further, a radio frame 114 is a time domain interval composed of 10 subframes.

The minimum transmission unit in the frequency domain is a subcarrier, and the transmission bandwidth of the whole system is composed of NBW subcarriers 104 in total.

In the time-frequency domain, the basic unit of a resource is a resource element (RE) 112, and it may be indicated as an OFDM symbol index and a subcarrier index.

A resource block (RB) 108 or a physical resource block (PRB) is defined as Nsymb successive OFDM symbols 102 in the time domain and NRB successive subcarriers 110 in the frequency domain. Accordingly, one PRB 108 is composed of Nsymb*NRB REs 112.

A PRB pair is in the unit of two connected PRBs in time axis, and is composed of Nsymb*2NRB REs 112. In general, the minimum transmission unit of data is a PRB unit. In an LTE system, it is general that Nsymb is Nsymb=7, and NRB is NRB=12. NBW and NRB are in proportion to the system transmission bandwidth.

Downlink control information (DCI) in an LTE or LTE-A system will be described below.

In an LTE system, scheduling information on downlink data or uplink data is transferred from a base station to a terminal through DCI. The DCI defines various formats, and a determined DCI format is applied and operated depending on whether the scheduling information is uplink data scheduling information or downlink data scheduling information, whether the DCI is compact DCI having a small size of control information, whether spatial multiplexing using multiple antennas is applied, or whether the DCI is DCI for power control. For example, DCI format 1 that is the scheduling control information for the downlink data is configured to include at least the following control information.

- Resource allocation type 0/1 flag: This is to notify whether a resource allocation type is type 0 or type 1. The type 0 allocates resources in the unit of a resource block group (RBG) through applying of a bitmap type. In an LTE system, the basic unit of scheduling is a RB that is expressed as a time and frequency domain resource, and the RBG is composed of a plurality of RBs to be considered as the basic unit of scheduling in the type 0. The type 1 allocates a specific RB in the RBG
- Resource block assignment: This is to notify of the RB that is allocated for data transmission. The expressed resource is determined in accordance with the system bandwidth and the resource allocation method.
- Modulation and coding scheme (MCS): This is to notify of a modulation method used for data transmission and the size of a transport block that is data to be transmitted.
- Hybrid Automatic-Repeat-Request (HARQ) process number: This is to notify of the process number of HARQ.
- New data indicator: This is to notify whether HARQ transmission is initial transmission or retransmission.
- Redundancy version: This is to notify of a redundancy version of HARQ.
- Transmit power control (TPC) command for physical uplink control channel (PUCCH): This is to notify of a transmission power control command for a PUCCH that is an uplink control channel.

The DCI is transmitted through a PDCCH or an enhanced PDCCH (EPDCCH) that is a downlink physical control channel after passing through a channel coding and modulation process.

A cyclic redundancy check (CRC) is attached to a DCI message payload, and the CRC is scrambled by a radio network temporary identifier (RNTI) corresponding to the identity of the terminal. Different RNTIs are used in accordance with the purpose of the DCI message, for example, UE-specific data transmission, power control command, or random access response. For example, the RNTI is not specifically transmitted, but is included in the CRC calculation process to be transmitted. If the DCI message transmitted on the PDCCH is received, the terminal checks the CRC using the allocated RNTI, and if the result of the CRC check is correct, it can be known that the corresponding message has been transmitted to the terminal.

A downlink control channel through which the DCI is transmitted in an LTE or LTE-A system will be described with reference to the drawing below.

Figure 2:
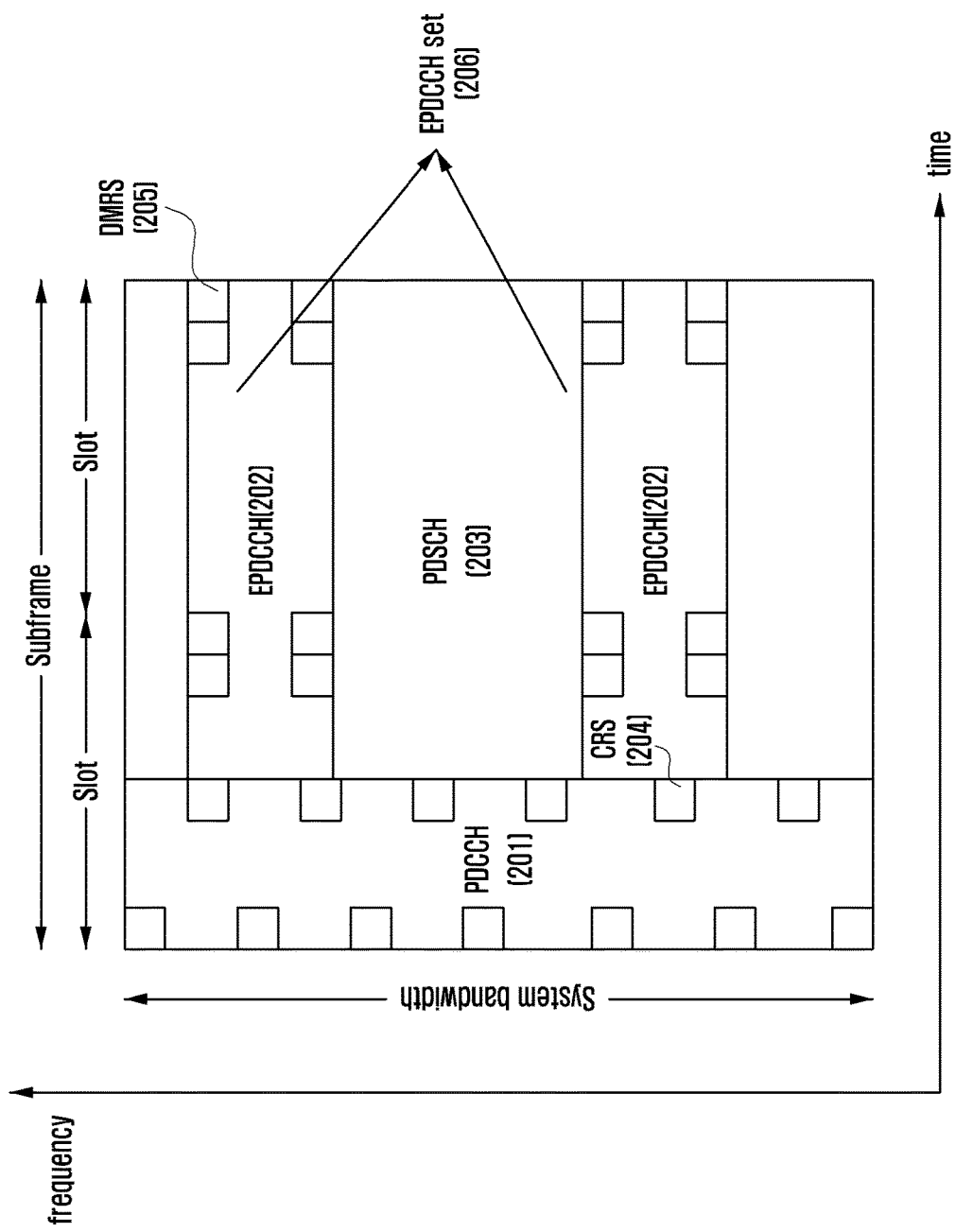
FIG. 2 is a diagram illustrating a physical downlink control channel (PDCCH) and an enhanced physical downlink control channel (EPDCCH) that are downlink control channels in a wireless communication system according to an embodiment of the present disclosure.

FIG. 2 is a diagram illustrating a PDCCH and an EPDCCH that are downlink control channels in a wireless communication system according to an embodiment of the present disclosure.

Referring to FIG. 2, a PDCCH 201 is time-multiplexed with a PDSCH 203 that is a data transmission channel, and is transmitted over the whole system bandwidth. The region of the PDCCH 201 is expressed by the number of OFDM symbols, and is a control format indicator (CFI) transmitted through a physical control format indicator channel (PCFICH) to be indicated by a terminal.

By allocating the PDCCH 201 to an OFDM symbol that comes to a fore portion of a subframe, a terminal can decode downlink scheduling allocation as fast as possible, and through this, decoding delay for a downlink shared channel (DL-SCH), that is, the whole downlink transmission delay, can be reduced. Since one PDCCH carries one DCI message and a plurality of terminals can be simultaneously scheduled in a downlink and an uplink, transmission through a plurality of PDCCHs may be simultaneously performed in each cell.

As a reference signal for decoding the PDCCH 201, a CRS 204 is used. The CRS 204 is transmitted for each subframe over the full band, and scrambling and resource mapping differ in accordance with a cell identity (ID). Since the CRS 204 is a reference signal commonly used by all terminals, UE-specific beamforming is unable to be used. Accordingly, a multi-antenna transmission technique for the PDCCH of the LTE is limited to open-loop transmission diversity. The number of CRS ports is implicitly known to the terminal from decoding of a physical broadcasting channel (PBCH).

Resource allocation of the PDCCH 201 is based on a control-channel element (CCE), and one CCE is composed of 9 resource element groups (EGs), that is, 36 resource elements (REs) in total. The number of CCEs required for a specific PDCCH 201 may be 1, 2, 4, or 8, and this may differ depending on the channel coding rate of the DCI message payload. As described above, the number of different CCEs is used to implement link adaptation of the PDCCH 201.

The terminal should detect a signal in a state where it does not know information on the PDCCH 201, and in an LTE, a search space indicating a set of CCEs for blind decoding has been defined. The search space is composed a plurality of sets at an aggregation level (AL) of each CCE, and it is not specifically signaled, but is implicitly defined through a function by the terminal identity and the subframe number. In each subframe, the terminal performs decoding of the PDCCH 201 with respect to all possible resource candidates that can be made from the CCEs in the configured search space, and processes information declared as valid to the corresponding terminal through the CRC checking.

The search space is classified into a cell-specific search space and a common search space. Terminals of a specific group or all terminals may search the common search space of the PDCCH 201 in order to receive cell-common control information, such as dynamic scheduling of system information or a paging message. For example, scheduling allocation information of the DL-SCH for transmission of system information block (SIB)-1 including enterprise information of a cell may be received by searching the common search space of the PDCCH 201. In addition, the terminal-specific DCI, such as scheduling information of uplink data or scheduling information of downlink data, is transmitted through the terminal-specific search space.

As various technologies, such as CA and coordinated multipoint (COMP), are supported in an LTE in the related art, it becomes difficult to secure sufficient transmission capacity for transmitting a downlink control signal only through the existing PDCCH. Accordingly, in LTE Release 11, an EPDCCH 202 is added as a physical channel for transmitting downlink DCI. The EPDCCH has been designed in a direction to satisfy the following requirements.

Control channel transmission capacity increase

Frequency-axis adjacent cell interference control

An RS sequence for the DMRS 205 of the EPDCCH 202 is defined as follows.

Mathematical expression 1

$$r(m) = \frac{1}{\sqrt{2}}(1 - 2 \cdot c(2m)) + j\frac{1}{\sqrt{2}}(1 - 2 \cdot c(2m+1)),$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

In the mathematical expression 1, an initial sequence used to generate a pseudo-random sequence c(n) is defined as follows.

$$c_{init} = (\lfloor n_s/2 \rfloor + 1) \cdot (2n_{ID,i}^{EPDCCH} + 1) \cdot 2^{16} + n_{SCID}^{EPDCCH}$$

Mathematical expression 2

In the mathematical expression 2, $n_{ID,i}^{EPDCCH}$ may be configured through terminal-specific higher layer signaling as follows ("dmrs-ScramblingSequenceInt-r11 INTEGER (0 ... 503)").

```
EPDCCH-SetConfig-r11 ::=           SEQUENCE {
    setConfigId-r11                    EPDCCH-SetConfigId-r11,
    transmissionType-r11               ENUMERATED {localised, distributed},
    resourceBlockAssignment-r11            SEQUENCE{
        numberPRB-Pairs-r11                    ENUMERATED {n2, n4, n8},
        resourceBlockAssignment-r11            BIT STRING (SIZE(4..38))
    },
    dmrs-ScramblingSequenceInt-r11     INTEGER (0..503),
    pucch-ResourceStartOffset-r11      INTEGER (0..2047),
    re-MappingQCL-ConfigId-r11         PDSCH-RE-MappingQCL-ConfigId-r11 OPTIONAL, -- Need
OR
    ...,
```

Frequency-selective scheduling

MBSFN subframe support

Coexistence with the existing LTE terminal

Referring to FIG. 2, the EPDCCH 202 is frequency-multiplexed with the PDSCH 203 to be transmitted. A base station can properly allocate resources for the EPDCCH 202 and the PDSCH 203 through scheduling, and through this, coexistence with data transmission for the existing LTE terminal can be effectively supported. However, since the EPDCCH 202 is allocated to one subframe as a while on time-axis, a loss occurs from the viewpoint of transmission delay time.

A plurality of EPDCCHs 202 constitute one EPDCCH set 206, and allocation of a set of EPDCCHs 202 is performed in the unit of a PRB pair. Location information for the EPDCCH set 206 is cell-specifically configured, and this is signaled through a remote radio control (RRC). In each terminal, maximally two EPDCCH sets 206 may be configured, and one EPDCCH set 206 may be configured to be simultaneously multiplexed to different terminals.

In the EPDCCH 202, a demodulation reference signal (DMRS) 205 is used as an RS for decoding. The DMRS 205 of the EPDCCH 202 uses the same pattern as that of the PDSCH 203. However, in contrast with the PDSCH 203, the DMRS 205 of the EPDCCH 202 supports maximally 4 antenna ports {107, 108, 109, 110}. The DMRS 205 of the EPDCCH 202 is transmitted only from the corresponding PRB from which the EPDCCH 202 is transmitted. In other words, if the EPDCCH 202 is not mapped and transmitted from a certain PRB, the DMRS 205 for decoding the corresponding EPDCCH 202 is not transmitted from the corresponding PRB.

Two $n_{ID,i}^{EPDCCH}$ values (i.e., i={0, 1} may be configured with respect to two EPDCCH sets 206 that may be configured to each terminal. As described above, a terminal-specific sequence is used for the DMRS 205, and through this, the DMRS 205 per terminal can be discriminated. Precoding for the EPDCCH 202 may be configured by a base station, and terminal-specific beamforming can be used. Through the DMRS 205, terminals can perform decoding of the EPDCCH 202 even if the terminals do not know what precoding has been used.

Port configuration information of the DMRS 205 may differ depending on a method for transmitting the EPDCCH 202. In the case of a localized transmission method, antenna ports corresponding to one EPDCCH 202 are randomly selected based on the ID of the terminal. If different terminals share the same time/frequency resources, that is, if multiuser MIMO transmission is to be used, DMRS antenna ports may be allocated to the respective terminals. Further, DMRS 205 may be shared to be transmitted, and in this case, the DMRS 205 configured through higher layer signaling may be discriminated through scrambling sequence. In the case of a distributed transmission method, up to two antenna ports of the DMRS 200 are supported, and a precoder cycling type diversity technique is supported. The DMRS 205 may be shared with respect to all REs transmitted in one PRB pair.

A resource mapping method of the EPDCCH will be described below with reference to the drawing.

Figure 3:
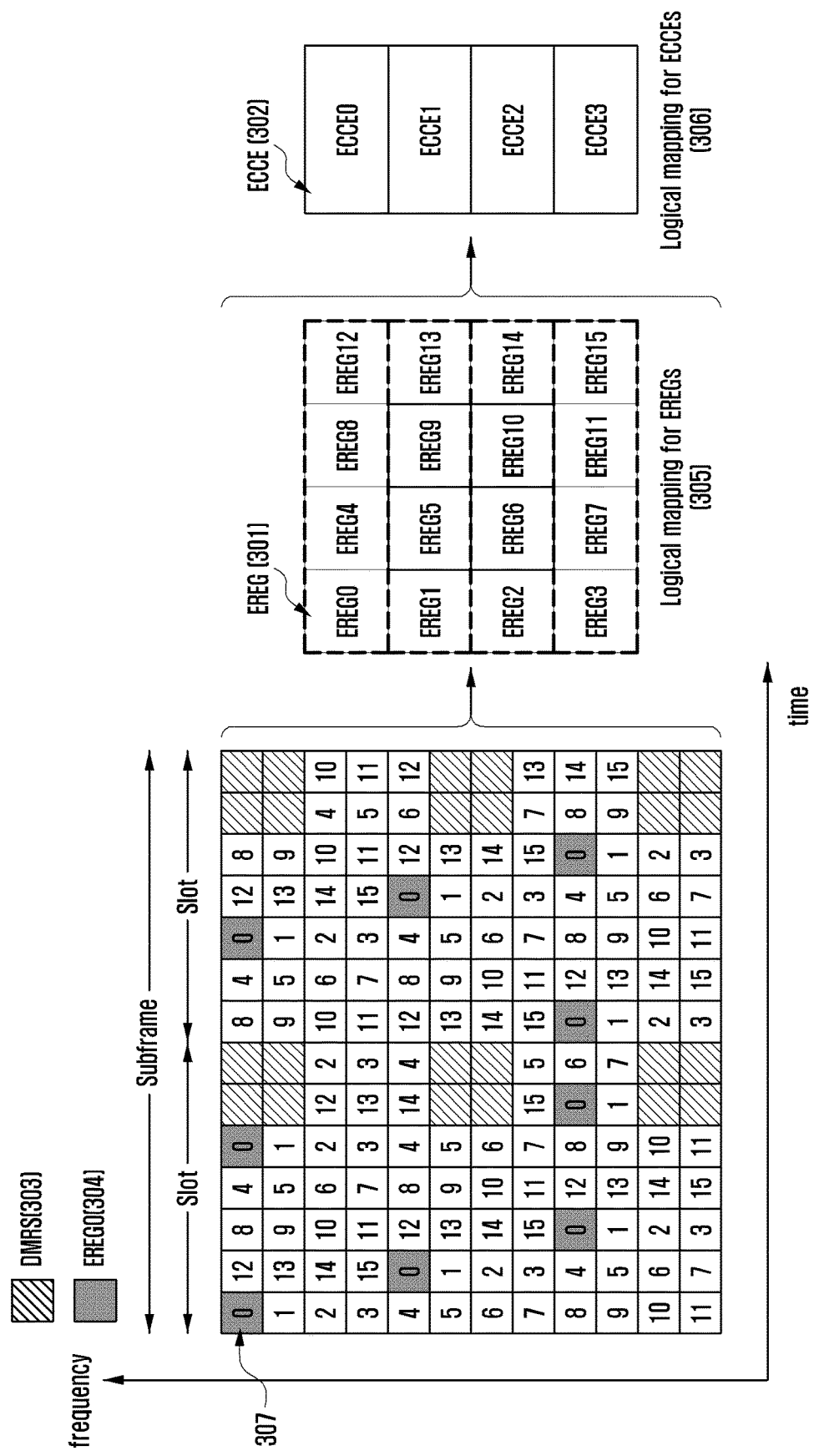
FIG. 3 is a diagram illustrating a resource mapping method for an EPDCCH in a wireless communication system according to an embodiment of the present disclosure.

FIG. 3 is a diagram illustrating a resource mapping method for an EPDCCH in a wireless communication system according to an embodiment of the present disclosure.

Referring to FIG. 3, one PRB pair is illustrated. In one PRB, 16 enhanced REG (EREG) 301 may exist. REs in one PRB pair may be mapped on an index of the EREG 301 corresponding to {0, 1, 2, . . . , 15}. In this case, REs onto which the DMRS 303 is mapped are excluded from numbering.

A set of REs corresponding to the respective indexes constitute one EREG 301. For example, a total of 9 REs 307 mapped onto index 0 exists in a PRB pair as illustrated in FIG. 3, and the 9 REs constitute an EREG0 304. For example, the REs numbered by respective indexes x (x={0, 1, 2, . . . , 15}) constitute respective EREGx. For convenience in describing embodiments of the present disclosure, the EREG 301 existing in one PRB pair is illustrated in a logical mapping method like 305 of FIG. 3 to be described.

The resource allocation of the EPDCCH is based on an enhanced CCE (ECCE) 302, and one ECCE 302 may be composed of 4 or 8 EREGs 301. The number of EREGs 301 per ECCE 302 may differ in accordance with the CP length and subframe configuration information.

FIG. 3 shows an example in which 4 EREGs 301 constitute one ECCE 302. More specifically, in 305 of FIG. 3, EREG0, EREG4, EREG8, and EREG12 are mapped onto ECCE0, and EREG1, EREG5, EREG9, and EREG13 are mapped onto ECCE1. Further, EREG2, EREG6, EREG10, and EREG14 are mapped onto ECCE2, and EREG3, EREG7, EREG11, and EREG15 are mapped onto ECCE3.

Accordingly, if 4 EREGs 301 constitute one ECCE 302, a total of 4 ECCEs 302 may exist in one PRB pair. For convenience in describing embodiments of the present disclosure, the ECCE 302 existing in one PRB pair is illustrated in a logical mapping method like 306 of FIG. 3 to be described.

The EPDCCH transmission method is divided into localized transmission and distributed transmission in accordance with the mapping method between the ECCE 302 and the EREG 301. In the localized transmission method, the EREGs 301 constituting the ECCE 302 exist in the same PRB pair in all. In contrast, in the distributed transmission method, the EREGs 301 constituting the ECCE 302 may exist in different PRB pairs among a plurality of PRB pairs configured for the EPDCCH transmission.

A search space in the EPDCCH will be described below.

The EPDCCH supports only a terminal-specific search space. The search space for the EPDCCH is defined as follows.

$$L\left\{\left(Y_{p,k} + \left\lfloor \frac{m \cdot N_{ECCE,p,k}}{L \cdot M_p^{(L)}} \right\rfloor + b\right) \mod \lfloor N_{ECCE,p,k}/L \rfloor \right\} + i$$

According to the definition of the EPDCCH search space as described above, the search space is a set of candidate control channels composed of ECCEs for which the terminal should attempt decoding at a given aggregation level, and the EPDCCH may have an aggregation level of 1, 2, 4, 6, 16, or 32. Since there are several aggregation levels to tie a plurality of ECCEs in a bundle, the terminal has a plurality of search spaces in accordance with the aggregation level. The aggregation levels of the EPDCCH may be 1, 2, 4, 8, 16, and 32, and may be determined by system parameters, such as a CP length, subframe configuration, EPDCCH format, localized/distributed transmission method, and the total number of ECCEs. An example of the number of EPDCCH candidates to be monitored by the terminal in the search space defined in accordance with the aggregation level in the EPDCCH is described in the following table.

TABLE 1

| | Number of EPDCCH candidates $M_p^{(L)}$ for Case 3 | | | |
|---|---|---|---|---|
| $N_{RB}^{X_p}$ | L = 1 | L = 2 | L = 4 | L = 8 |
| 2 | 8 | 4 | 2 | 1 |
| 4 | 6 | 6 | 2 | 2 |
| 8 | 6 | 6 | 2 | 2 |

In table 1 as above, $N_{RB}^{X_p}$ means the number of PRB pairs configured with respect to the EPDCCH set p. Case 3 in table 1 means a scenario determined by system parameters, such as a subframe structure, DCI format, and system bandwidth. Since the detailed contents thereof are unnecessary in describing embodiments of the present disclosure, the explanation thereof will be omitted.

As an example of the above table 1, if the EPDCCH set is composed of 4 PRB pairs, 6, 6, 2, and 2 EPDCCH candidates may exist with respect to the aggregation levels 1, 2, 4, and 8, respectively, and thus, the terminal may perform total 14 times blind decoding with respect to one DCI format in the whole search space. If a search for two DCI formats is performed in the corresponding search space, 28 times blind decoding may be performed.

As described above, the PDCCH or EPDCCH that is the downlink control channel in the LTE or LTE-A has been described.

In the LTE, the downlink control channel may be transmitted at a subframe interval, and thus, the terminal should perform blind decoding for the downlink control channel for each subframe. As an example, with respect to an LTE PDCCH, the terminal may perform blind decoding for the downlink control channel maximally 44 times for one component carrier. This imposes a very big burden from the viewpoint of power consumption of the terminal. In particular, in the blind decoding, most power consumption is determined by a channel decoding operation, for example, a burden of a decoding operation against convolutional coding. Accordingly, in order to reduce the power consumption of the terminal due to the blind decoding for the downlink control channel, it is very important to limit in advance the search space for which the blind decoding is to be performed before the channel decoding is performed.

By the above-described reason, the present disclosure provides a technique for reducing power consumption of a terminal in a wireless communication system. According to the technique for monitoring a downlink control channel proposed by the present disclosure, blind decoding is not performed with respect to time/frequency resources whereby the downlink control channel is not actually transmitted based on a correlation value for an RS sequence, and thus, the number of times of blind decoding is greatly reduced to minimize the power consumption of the terminal.

Hereinafter, preferred embodiments of the present disclosure will be described with reference to the accompanying drawings. In the accompanying drawings, it is to be noted that the same reference numerals are used for the same constituent elements. Further, a detailed description of known functions and configurations will be omitted if it obscures the subject matter of the present disclosure.

Further, in describing embodiments of the present disclosure, an LTE system will be the main subject. However, the main subject of the present disclosure may also be applied to other communication systems having similar technical backgrounds or channel types through partial modifications thereof in a range that does not greatly deviate from the scope of the present disclosure through the judgment of those skilled in the art.

Figure 4:
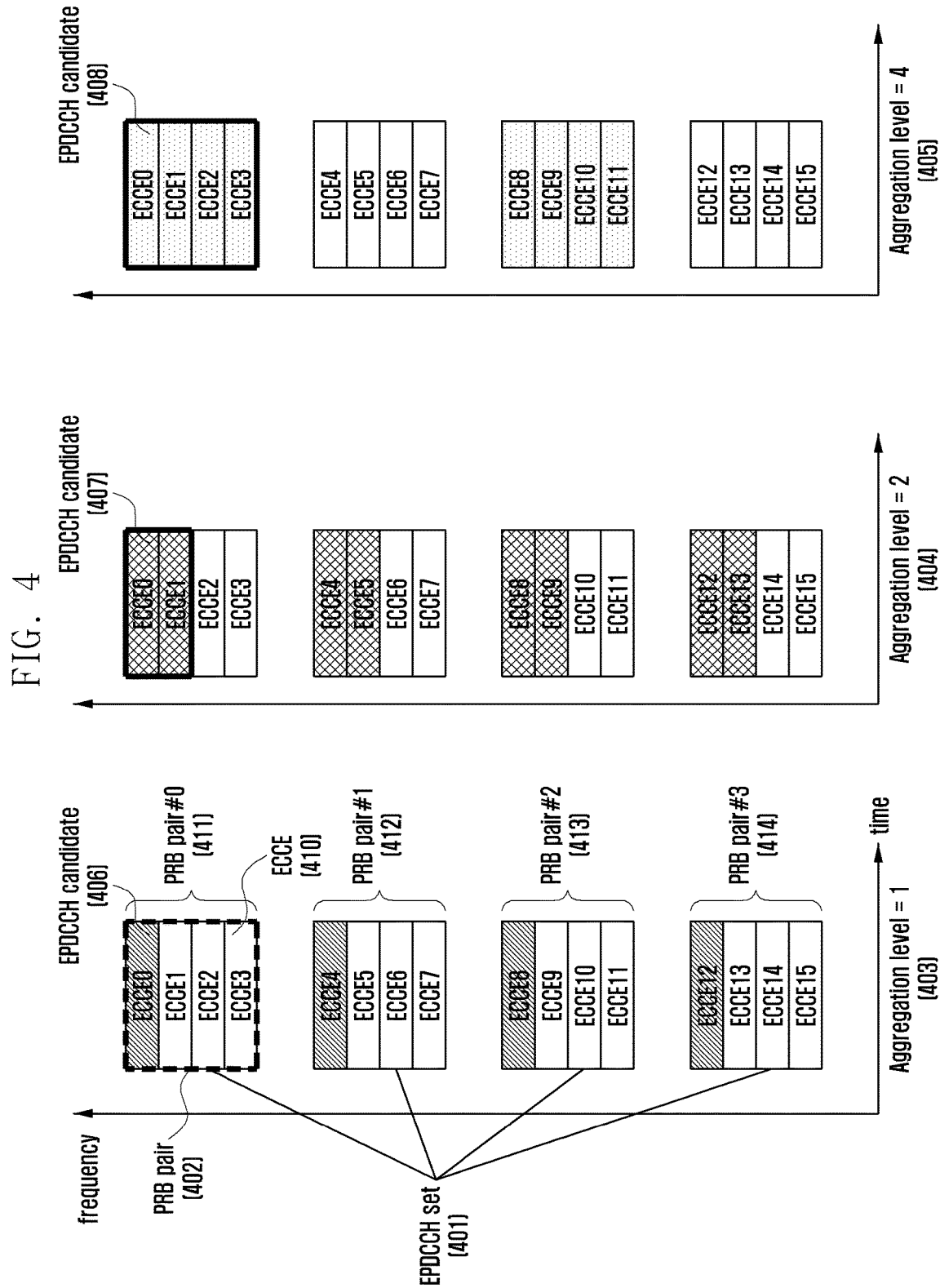
FIG. 4 is a diagram illustrating an embodiment of a search space of an EPDCCH in a wireless communication system according to an embodiment of the present disclosure.

FIG. 4 is a diagram illustrating an embodiment of a search space of an EPDCCH in a wireless communication system according to an embodiment of the present disclosure.

Referring to FIG. 4, an example in which one EPDCCH set 401 is composed of 4 PRB pairs 402 is illustrated. In one PRB pair 402, 4 ECCEs 410 exist, and for convenience in describing the present disclosure, the above-described ECCE of FIG. 3 is expressed in a logical mapping method 306.

In FIG. 4, an example of a search space for aggregation level 1 403, aggregation level 2 404, and aggregation level 4 405 is illustrated. In accordance with the definition of the search space as described above, at aggregation level 1 403, one EPDCCH candidate 406 may be mapped onto one ECCE 410, and at aggregation level 2 404, one EPDCCH candidate 406 may be mapped onto two ECCEs 410. Further, at aggregation level 4 405, one EPDCCH candidate 408 may be mapped onto 4 ECCEs 410.

In an example of FIG. 4, in the case of aggregation level 1 403, 4 EPDCCH candidates 406 exist, and in the case of aggregation level 2 404, 4 EPDCCH candidates 407 exist. Further, in the case of aggregation level 4 403, two EPDCCH candidates 408 exist.

According to an example of a search space of the EPDCCH illustrated in FIG. 4, one EPDCCH may be transmitted through one PRB pair for a specific aggregation level. Specifically, referring to FIG. 4, if the EPDCCH is transmitted at aggregation level 1 403, it may be mapped onto the search space corresponding to the aggregation level 1 403, that is, one resource of a set of EPDCCH candidates 4306 {ECCE0, ECCE4, ECCE8, ECCE12}, to be transmitted, and each of the EPDCCH candidates 406 exists in 4 PRB pairs 402 constituting the EPDCCH set 401. As a result, one EPDCCH may be transmitted from one PRB pair. If the EPDCCH is mapped onto the ECCE0 at aggregation level 1 403 to be transmitted, it may be transmitted through PRB pair #0 411, whereas if it is mapped onto the ECCE8, it may be transmitted through PRB pair #2 413. Moreover, if the EPDCCH is mapped onto the ECCE4 at aggregation level 1 403 to be transmitted, it may be transmitted through PRB pair #1 412, whereas if it is mapped onto the ECCE12, it may be transmitted through PRB pair #3 414.

Figure 5A:
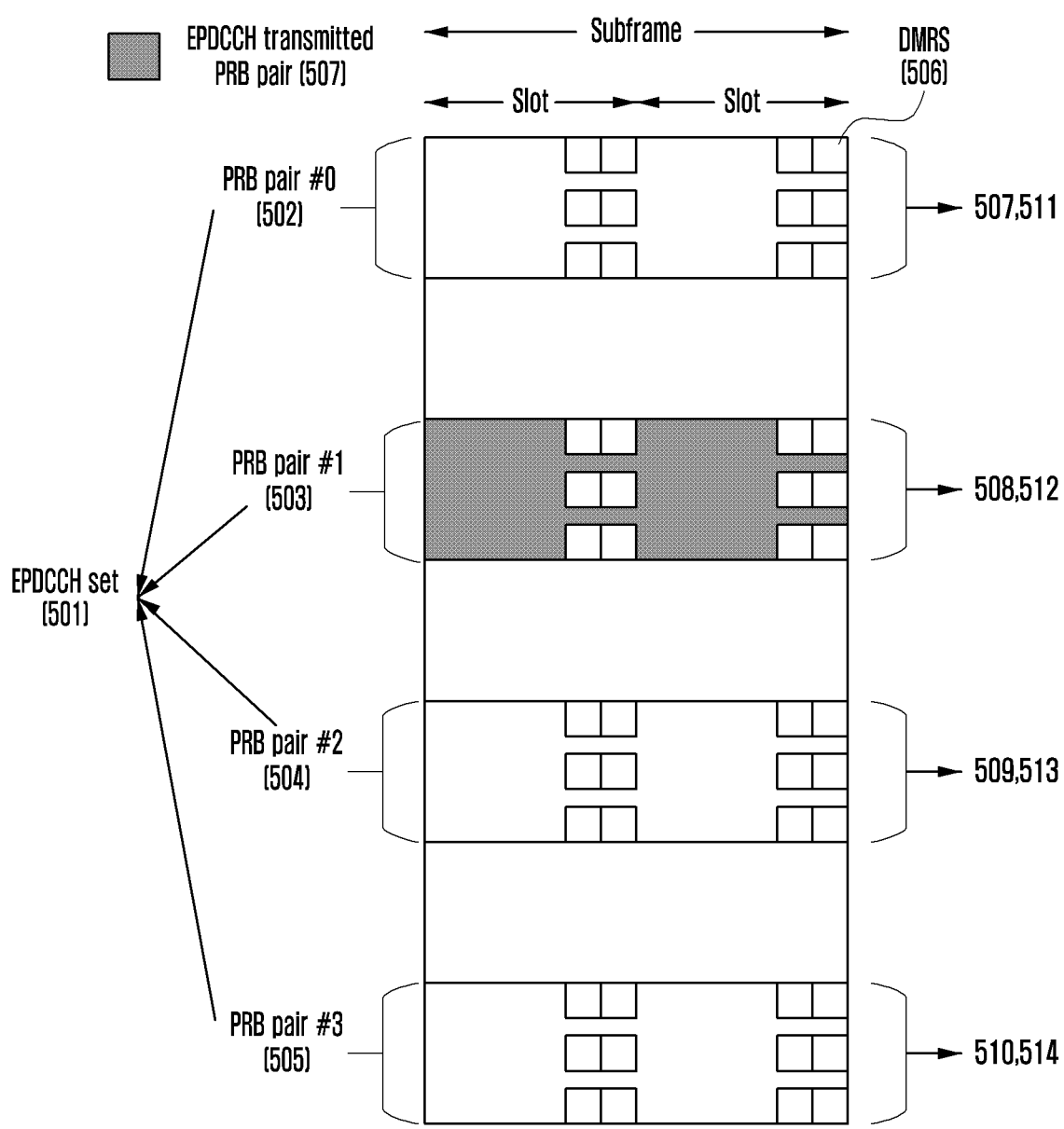
FIGS. 5A and 5B are diagrams illustrating a blind search method according to an embodiment of the present disclosure.
Figure 5B:
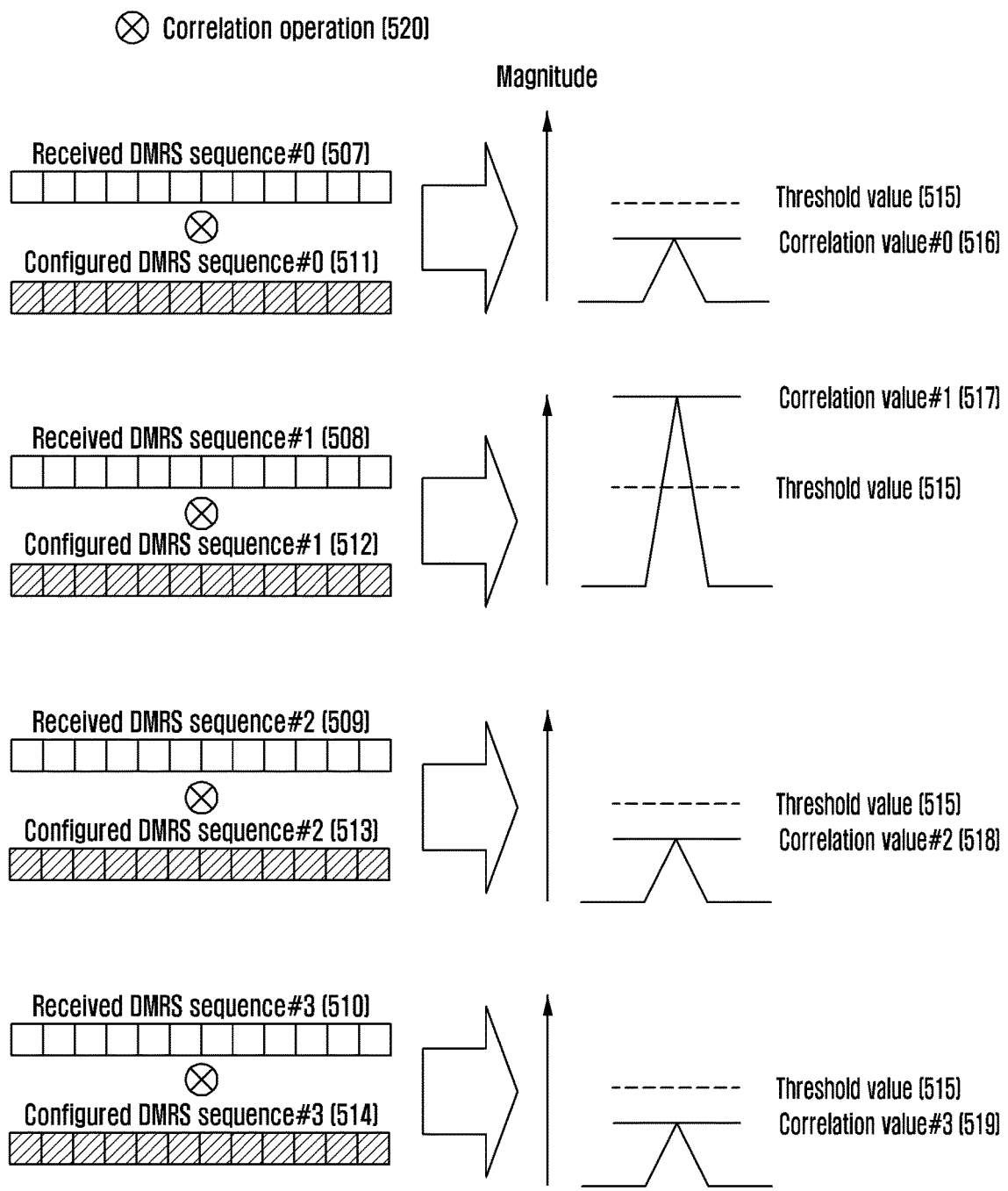

FIGS. 5A and 5B are diagrams illustrating a blind search method according to an embodiment of the present disclosure.

Referring to FIGS. 5A and 5B, an example in which one EPDCCH set 501 is configured to 4 PRB pairs (PRB pair #0 502, PRB pair #1 503, PRB pair #2 504, and PRB pair #3 505) is illustrated. Further, in each PRB pair, a DMRS 506 for decoding the EPDCCH may be transmitted. In this case, as described above, the DMRS 506 in the PRB pair can be transmitted only in the PRB pair onto which the EPDCCH is actually mapped to be transmitted.

Specifically, referring to FIGS. 5A and 5B, the EPDCCH of a certain terminal (e.g., terminal #0) may be mapped onto the resource of the PRB pair #1 503 to be transmitted. In this case, the terminal-specific DMRS of terminal #0 can be transmitted only from the PRB pair #1 503. Here, as described above, the terminal-specific DMRS is defined as a DMRS for which a terminal-specific sequence configured to the corresponding terminal defined in the mathematical expressions 1 and 2 is used.

For example, terminal #0 may be configured to receive a value of the mathematical expression 2 through RRC signaling, and through this, the base station may generate an inherent sequence to be used as the DMRS 506 of terminal #0. From the remaining PRB pairs (PRB pair #0 502, PRB pair #2 504, and PRB pair #4 505) for which the EPDCCH of terminal #0 is not transmitted, the DMRS 506 of terminal #0 is not transmitted.

In this case, the DMRS 506 that exists in the remaining PRB pair for which the EPDCCH is not transmitted may be not transmitted at all or the DMRS 506 for other terminals may be transmitted depending on whether the EPDCCHs of the other terminals are allocated. As an example, if the EPDCCHs of other terminals are not transmitted through PRB pair #0, the DMRS 506 of PRB pair #0 502 may be turned off. Further, as another example, if the EPDCCH of terminal #1 is transmitted to PRB pair #2 504, the terminal-specific DMRS 506 for terminal #1 may be transmitted to PRB pair #2 504.

In an embodiment of the present disclosure as illustrated in FIGS. 5A and 5B, the terminal receives PRB pairs 502, 503, 504, and 505 corresponding to the EPDCCH set 501, and then may perform a correlation operation 520 between DMRS sequences 507, 508, 509, and 510 received from the PRB pair and predetermined DMRS sequences 511, 512, 513, and 514.

First, the predetermined DMRS sequences 511, 512, 513, and 514 as illustrated in FIGS. 5A and 5B will be described.

As described above, the sequence used as the DMRS for the EPDCCH decoding may be generated from the mathematical expressions 1 and 2. The terminal may be configured to receive the terminal-specific random sequence defined in the mathematical expression 2 through the RRC signaling, and through this, it may generate a random sequence used for the DMRS from the mathematical expression 1.

The generated terminal-specific DMRS sequence is transmitted at pre-engaged DMRS location in the respective PRB pairs 502, 503, 504, and 505 constituting the EPDCCH set 501. As an example, FIGS. 5A and 5B illustrate that 12 REs in the respective PRB pairs are used for DMRS transmission.

Accordingly, the base station may transmit the terminal-specific sequence of length 12 per PRB pair using a pre-engaged mapping method, and the terminal may detect the DMRS since it knows what the corresponding DMRS sequence is through the configuration. As described above, the terminal-specific DMRS may be transmitted only in the PRB pair for which the EPDCCH of the corresponding terminal is transmitted.

In an example of FIGS. 5A and 5B, terminal-specific DMRS sequences that may be transmitted to PRB pair #0 502, PRM pair #1 503, PRB pair #2 504, and PRB pair #3 505 are defined as configured DMRS sequence #0 511, configured DMRS sequence #1 512, configured DMRS sequence #2 513, and configured DMRS sequence #3 514, respectively.

In FIGS. 5A and 5B, for convenience in explanation, the received DMRS sequences 507, 508, 509, and 510 are expressed through logical mapping. More specifically, the DMRS 506 in a certain PRB pair 502 may be mapped onto 12 REs in total, and it may correspond to mapping of the sequences of length 12 in accordance with the mathematical expression 1. Accordingly, the received DMRS may be illustratively expressed as the sequences of length 12 (507, 508, 509, and 510). This may be expressed as in mathematical expression 3 below.

$$y_k(m) = h_k(m) \times r_k(m), \text{ where } m = 0, 2, \ldots, L-1 \quad \text{Mathematical expression 3}$$

In the mathematical expression 3, rK(m) means the m-th element of a DMRS sequence transmitted to the k-th PRB pair, and is determined through the mathematical expression 1. Further, hK(m) means an effective channel coefficient through which rK(m) has passed. Here, the effective channel coefficient may include all distortions that a transmitted signal suffers until it arrives at a receiving end, and it may include not only distortions caused by the actual physical channel but also distortions caused by transmission precoding. Further, yK(m) is a DMRS sequence received by the terminal from the k-th PRB pair.

In the above-described example, since the sequence of length 12 has been considered, the length may be L=12. In an example illustrated in FIGS. 5A and 5B, since the terminal can receive the DMRS from 4 PRB pairs 502, 503, 504, and 505 in total, the received 4 DMRS sequences are denoted by 507, 508, 509, and 510.

Next, the correlation operation 520 as illustrated in FIGS. 5A and 5B will be described.

An example of the correlation operation 520 for two complex number sequences yK and rK of length L may be defined as in mathematical expression 4 below.

$$\text{Corr}_k = \alpha \times \Sigma_{m=0}^{L-1} |y_k(m) \times \text{conj}(r_k(m))| \quad \text{Mathematical expression 4}$$

In the mathematical expression 4, conj(x) means a conjugate complex number, and |x| means an absolute value of x. Further, a is a constant for normalization.

The correlation operation 520 for the received DMRS sequences 507, 508, 509, and 510 of FIGS. 5A and 5B means that a terminal performs the correlation operation 520 between the original DMRS sequences rK and the received DMRS sequences yK with respect to PRB pair #k.

In the mathematical expression 4, k index may be defined as PRB pair #k, and Corrk may be defined as correlation values of PRB pair #k. In an example of FIGS. 5A and 5B, since total 4 PRB pairs 502, 503, 504, and 505 exist, total 4 correlation values can be calculated.

An example of a method for monitoring a downlink control channel according to an embodiment of the present disclosure as illustrated in FIGS. 5A and 5B will be described. As an example, a situation in which the EPDCCH of terminal #0 is transmitted to PRB pair #1 503 is assumed.

Terminal #0 may receive PRB pair #0 502, #1 503, #2 504, and #3 505 configured as an EPDCCH set 501. Thereafter, terminal #0 should perform blind decoding with respect to a predetermined terminal-specific search space. However, in an embodiment of the present disclosure, prior to perform the blind decoding with respect to the terminal-specific search space, the terminal may first perform the correlation operation 520 as defined above with respect to the DMRS sequences 507, 508, 509, and 510 received from the respective PRB pairs 502, 503, 504, and 505.

Referring to FIGS. 5A and 5B, the DMRS sequences received from PRB pair #0 502, #1 503, #2 504, and #3 505 are illustrated as received DMRS sequence #0 507, received DMRS sequence #1 508, received DMRS sequence #2 509, and received DMRS sequence #3 510.

Terminal #0 may calculate a correlation value defined in the mathematical expression 4 through performing of the correlation operation 520 with respect to the DMRS sequences received from the respective pairs and the configured DMRS sequences.

In an example of FIGS. 5A and 5B, correlation values calculated through PRB pair #0 502, #1 503, #2 504, and #3 505 are illustrated as correlation value #0 516, correlation value #1 517, correlation value #2 518, and correlation value #3 519. In this case, since the base station transmits the DMRS 506 of terminal #0 only through PRB pair #1 503, only the received DMRS sequence #1 508 is transmitted to terminal #0 as the predetermined DMRS sequence (DMRS sequence #1 512).

As described above, through PRB pair #0, #2, and #3, the DMRS of another terminal may be transmitted, or the DMRS transmission may be turned off. Accordingly, all the received DMRS sequence #0 507, the received DMRS sequence #2 509, and the received DMRS sequence #3 510 are sequences that are not related to the DMRS sequences preconfigured to terminal #0 (configured DMRS sequence #0 511, configured DMRS sequence #2 513, and configured DMRS sequence #3 511).

Accordingly, the correlation value in PRB pair #1 503 among the correlation values calculated after the correlation operation 520 may have the largest magnitude. In an example as illustrated in FIGS. 5A and 5B, correlation value #1 517 has the largest value as compared with other correlation values (correlation value #0 518, correlation value #2 518, and correlation value #3 519).

In an embodiment of the present disclosure, terminal #0 may select a PRB pair that will actually perform the blind decoding based on the calculated magnitude of the correlation value. To determine this, terminal #0 may compare the magnitude of the predetermined threshold value 515 with the magnitude of the calculated correlation value. In an example as illustrated in FIGS. 5A and 5B, all of correlation value #0 516, correlation value #2 518, and correlation value #3 519 have magnitudes less than that of the predetermined threshold value 515, and correlation value #1 has a magnitude that is greater than that of the predetermined threshold value 515.

Accordingly, terminal #0 may assume that the DMRS of terminal #0 itself has been transmitted to PRB pair #1 503 having a correlation value that is greater than the threshold value 515. Since this means that the EPDCCH of terminal #0 has been transmitted to PRB pair #1 503, terminal #0 may perform the blind decoding only with respect to the search space existing in PRB pair #1. As a result, the terminal does not perform the blind decoding with respect to all PRB pairs corresponding to the configured EPDCCH set 501, but may perform the blind decoding only with respect to PRB pairs (PRB pair #1 503 in an example of FIGS. 5A and 5B) selected through the correlation value operation and comparison with the threshold value, and thus, the number of times of blind decoding can be reduced.

Figure 6:
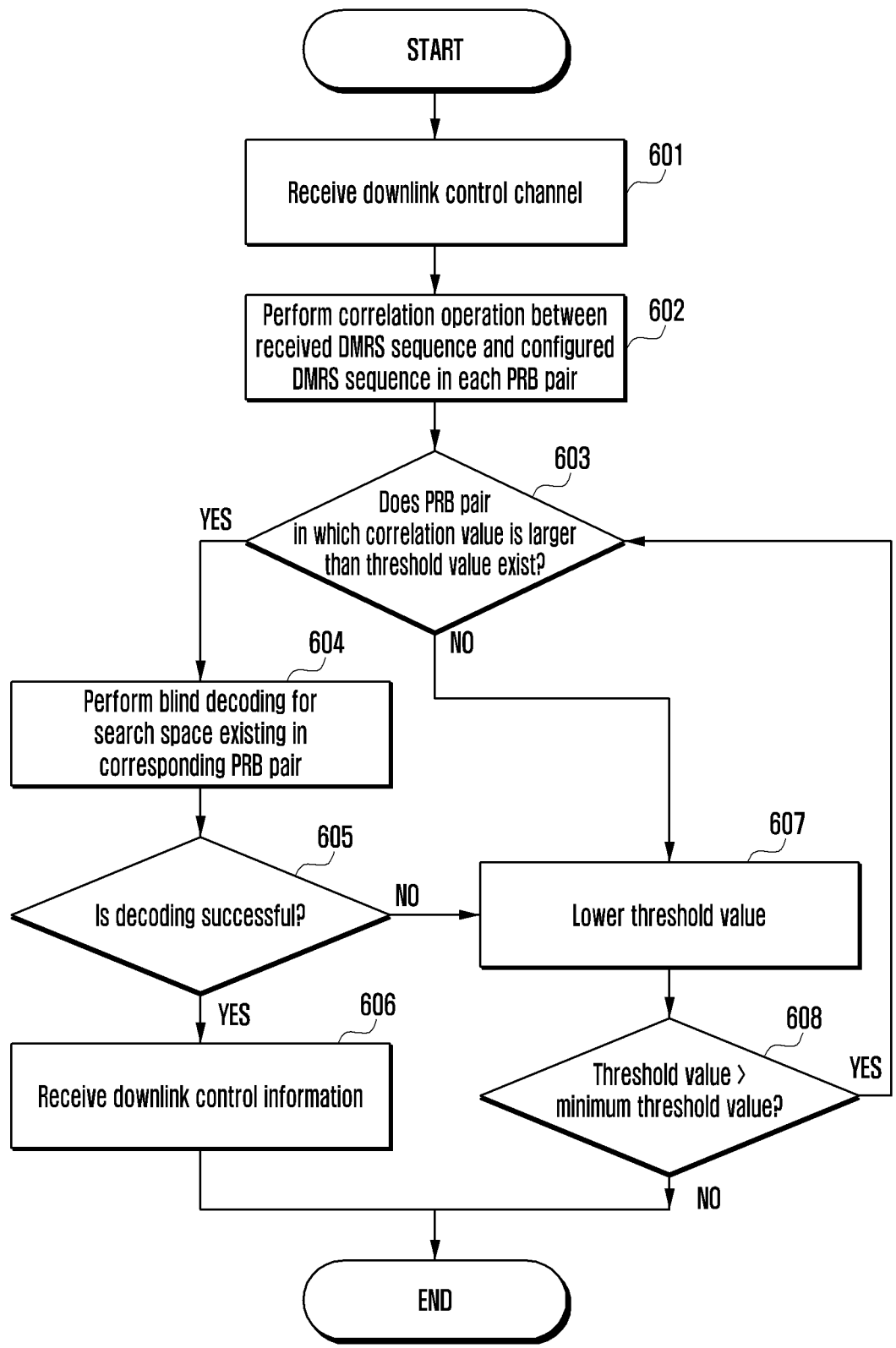
FIG. 6 is a diagram illustrating an operation of a terminal according to an embodiment of the present disclosure.

FIG. 6 is a diagram illustrating an operation of a terminal according to an embodiment of the present disclosure.

Referring to FIG. 6, at operation 601, the terminal may receive a downlink control channel (e.g., EPDCCH set). At operation 602, the terminal performs the correlation operation between the received DMRS sequence and the configured DMRS sequence with respect to respective PRB pairs configured to an EPDCCH set.

At operation 603, the terminal compares the correlation values operated in respective PRB pairs with a predetermined threshold value, and determines whether there exists a PRB pair in which the calculated correlation value is greater than the threshold value. If there is a PRB pair in which the calculated correlation value is greater than the threshold value, the terminal, at operation 604, performs blind decoding for the search space existing in the corresponding PRB pair.

At operation 605, the terminal determines whether decoding for the EPDCCH has succeeded. If the decoding has succeeded, the terminal, at operation 606, may receive downlink control information.

If the decoding has failed, the terminal proceeds to operation 607 and operates to lower the threshold value. Thereafter, at operation 608, the terminal may compare a new threshold value with the minimum threshold value. Here, the minimum threshold value means a minimum value of the threshold value that is predetermined as a system parameter.

If it is determined that the threshold value is equal to or less than the minimum threshold value at operation 608, the terminal may directly stop its operation. If it is determined that the threshold value is greater than the minimum threshold value at operation 608, the terminal proceeds to operation 603 to compare again the lowered threshold value with the correlation values operated in the respective PRB pairs, and may repeatedly perform the subsequent terminal operation.

At this time, only in the case where the terminal re-performs the operation 604 after passing through the operation 603 again, the terminal may perform the blind decoding only with respect to newly selected PRB pairs without performing again the blind decoding with respect to the PRB pairs for which the blind decoding has been previously performed. If it is determined that the PRB pair, in which the correlation value that is greater than the threshold value configured at operation 603 has been calculated, does not exist, the terminal, at operation 607, may control again the threshold value, and the subsequent operation is the same as the operation as described above.

Figure 7:
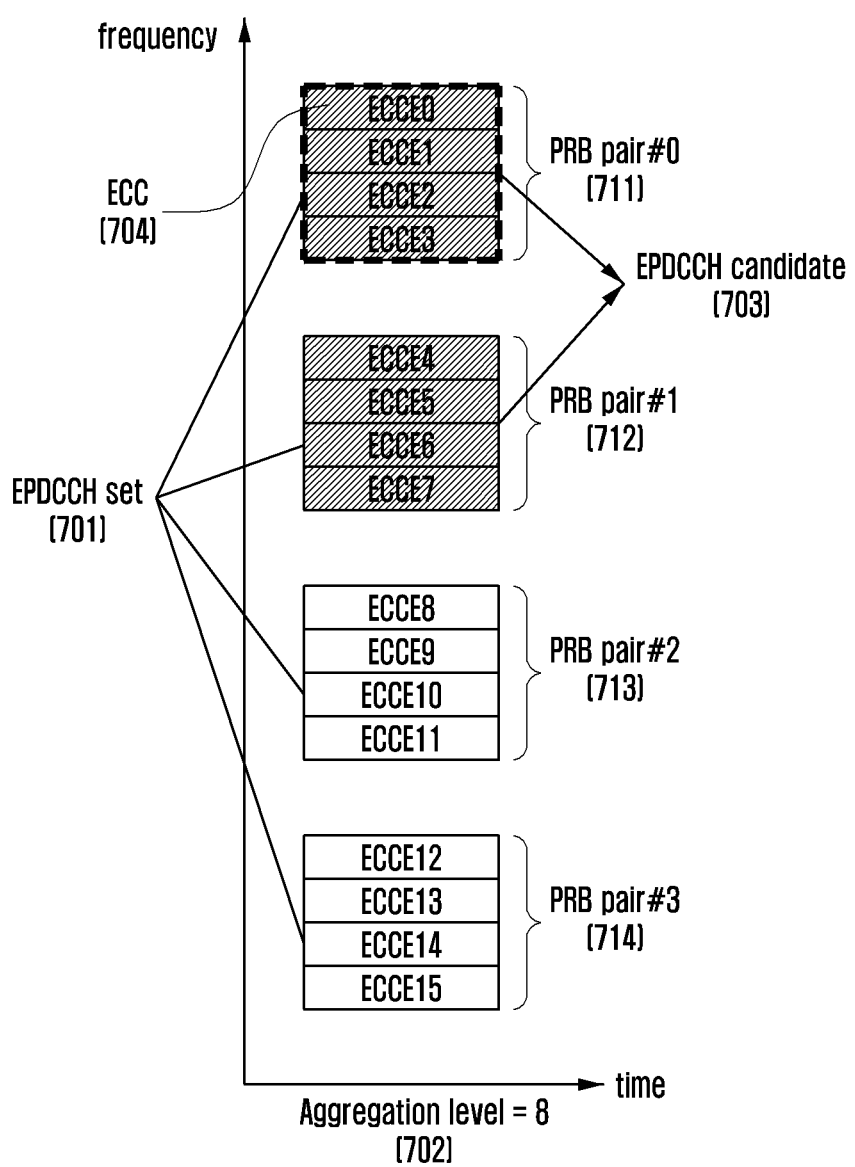
FIG. 7 is a diagram illustrating an embodiment of a search space of an EPDCCH in a wireless communication system according to an embodiment of the present disclosure.

FIG. 7 is a diagram illustrating an embodiment of a search space of an EPDCCH in a wireless communication system according to an embodiment of the present disclosure.

Referring to FIG. 7, an example in which one EPDCCH set 701 is composed of 4 PRB pairs 711, 712, 713, and 714 is illustrated. In one PRB pair, 4 ECCEs 704 exist, and for convenience in describing the present disclosure, it is to be noted that the above-described ECCE of FIG. 3 is expressed in a logical mapping method 306.

In FIG. 7, an example of a search space for aggregation level 8 792 is illustrated. In accordance with the definition of the search space as described above, at aggregation level 8 703, one EPDCCH candidate 703 may be mapped onto 8 ECCEs (e.g., ECCE0, ECCE1, ECCE2, ECCE3, ECCE4, ECCE5, ECCE6, and ECCE7). In an example of FIG. 7, in the case of aggregation level 8 703, one EPDCCH candidate 703 exists in a given EPDCCH set 701. According to an example of a search space of the EPDCCH illustrated in FIG. 7, one EPDCCH may be transmitted through two PRB pairs (e.g., PRB pair #0 711 and PRB pair #1 712) for a specific aggregation level 8 702.

Figure 8A:
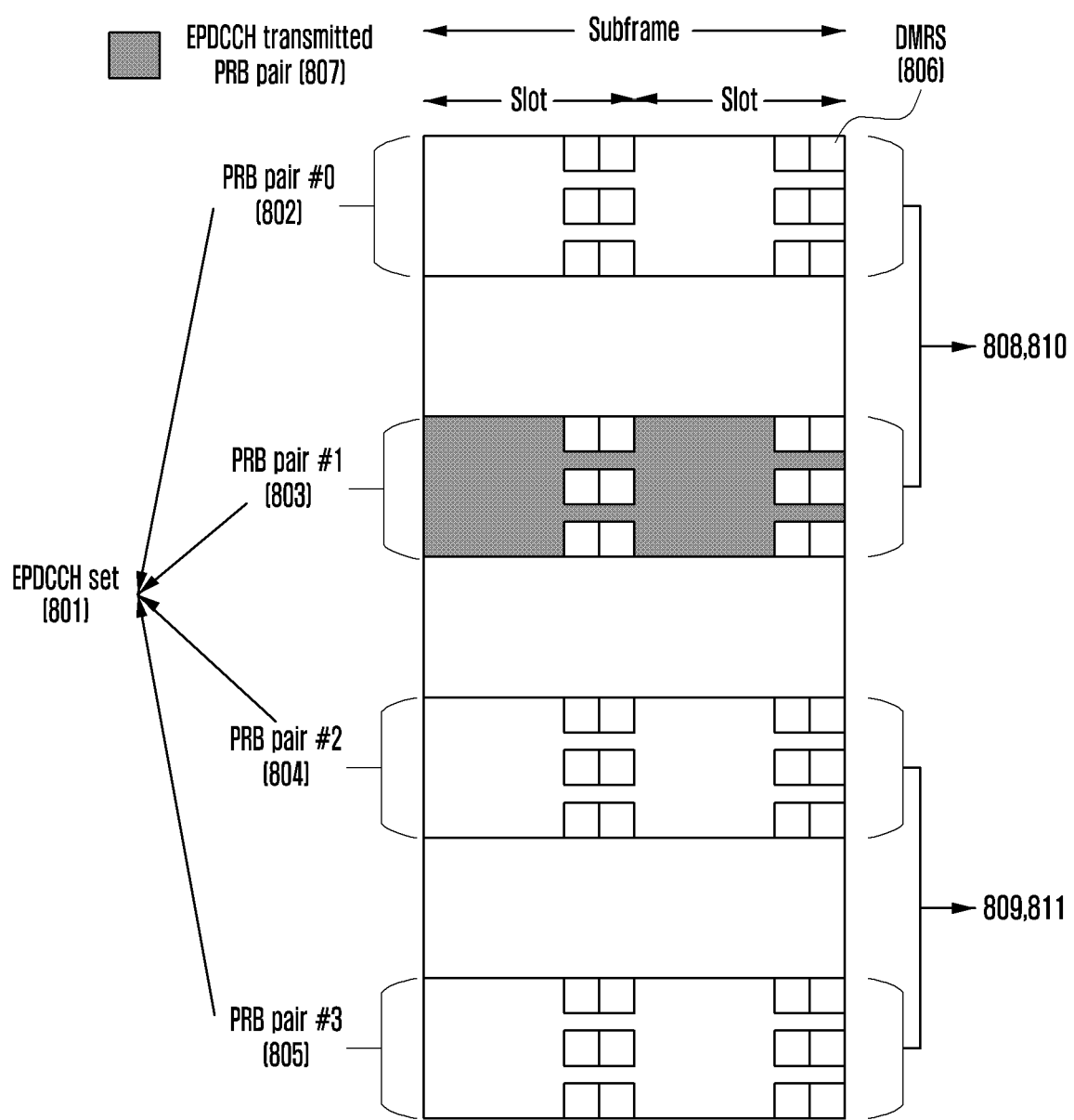

FIGS. 8A and 8B are diagrams illustrating a blind search method according to an embodiment of the present disclosure.

Referring to FIGS. 8A and 8B, an example in which one EPDCCH set 801 is configured to 4 PRB pairs (PRB pair #0 802, PRB pair #1 803, PRB pair #2 804, and PRB pair #3 805) is illustrated. Further, in each PRB pair, a DMRS 806 for decoding the EPDCCH may be transmitted. In this case, as described above, the DMRS 806 in the PRB pair 807 can be transmitted only in the PRB pair 807 onto which the EPDCCH is actually mapped to be transmitted.

Specifically, referring to FIGS. 8A and 8B, one EPDCCH of a certain terminal (e.g., terminal #0) may be transmitted through PRB pair #0 802 and PRB pair #1 803. In this case, the terminal-specific DMRS 806 of terminal #0 can be transmitted from the PRB pair #1 802 and PRB pair #1 803.

From the remaining PRB pairs, that is, PRB pair #2 804 and PRB pair #3 805, for which the EPDCCH of terminal #0 is not transmitted, the DMRS 806 of terminal #0 is not transmitted. In this case, the DMRS 806 that exists in the remaining PRB pair for which the EPDCCH is not transmitted may be not transmitted at all or the DMRS 806 for other terminals may be transmitted depending on whether the EPDCCHs of other terminals are allocated. As an example, if the EPDCCHs of other terminals are not transmitted through PRB pair #2 804, the DMRS 806 of PRB pair #2 804 may be turned off. Further, as another example, if the EPDCCH of terminal #1 is transmitted to PRB pair #3 805, the terminal-specific DMRS 806 for terminal #1 may be transmitted to PRB pair #3 805.

In an embodiment of the present disclosure as illustrated in FIGS. 8A and 8B, the terminal receives PRB pairs 802, 803, 804, and 805 corresponding to the EPDCCH set 801, and then may perform a correlation operation 820 between DMRS sequences received from the plurality of PRB pairs and predetermined DMRS sequences. In an example of FIGS. 8A and 8B, it is illustrated that the correlation operation 820 is performed with respect to DMRS sequences 808 and 809 received from two PRB pairs and predetermined DMRS sequences 810 and 811 corresponding to this.

Figure 12:
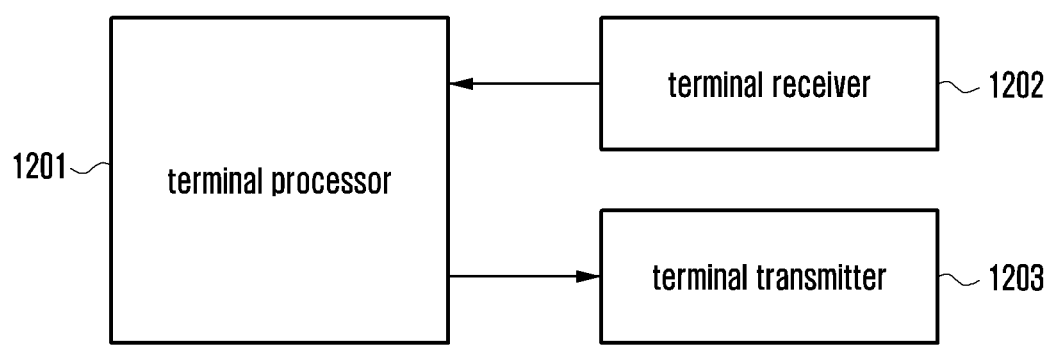
FIG. 12 is a block diagram of a terminal according to an embodiment of the present disclosure.

More specifically, in an example of FIGS. 8A and 8B, 12 REs in each PRB pair may be used for DMRS transmission, and accordingly, total 24 REs may be used for the DMRS transmission in two PRB pairs. Accordingly, the base station may transmit the terminal-specific sequence of length 12 per PRB pair using a pre-engaged mapping method, and the terminal-specific sequence of total length 24 may be mapped onto two PRB pairs.

In an example of FIGS. 8A and 8B, terminal-specific sequence of length 24 that may be transmitted through PRB pair #0 802 and PRB pair #1 803 is defined as configured DMRS sequence #0 810, and terminal-specific sequence of length 24 that may be transmitted through PRB pair #2 804 and PRB pair #3 805 is defined as configured DMRS sequence #0 811. In the same manner, in an example of FIGS. 8A and 8B, the DMRS sequence received through PRB pair #0 802 and PRB pair #1 803 is defined as received DMRS sequence #0 808, and the DMRS sequence received through PRB pair #2 804 and PRB pair #3 805 is defined as received DMRS sequence #1 811.

An example of a method for monitoring a downlink control channel according to an embodiment of the present disclosure as illustrated in FIGS. 8A and 8B will be described. As an example, a situation in which one EPDCCH of terminal #0 is transmitted to PRB pair #0 802 and PRB pair #1 803 is assumed.

Terminal #0 may receive PRB pair #0 802, #1 803, #2 804, and #3 805 configured as an EPDCCH set 801. Thereafter, a terminal according to an embodiment of the present disclosure may first perform the correlation operation as defined above with respect to DMRS sequences 808 and 809 received from the respective pairs 802, 803, 804, and 805 before performing the blind decoding for the terminal-specific search space.

Referring to FIGS. 8A and 8B, terminal #0 may calculate a correlation value that is defined in the mathematical expression 4 by performing correlation operation 820 between the DMRS sequences received from a plurality of PRB pairs and the predetermined DMRS sequences. In an example of FIGS. 8A and 8B, correlation values calculated from PRB pair #0 802 and #1 803 and PRB pair #2 804 and #3 805 are illustrated as correlation value #0 813 and correlation value #1 814. In this case, as described above, since the base station transmits the DMRS 806 of terminal #0 only through PRB pair #0 802 and #1 803, only the received DMRS sequence #0 808 is transmitted to terminal #0 as the predetermined DMRS sequence (DMRS sequence #0 810).

In contrast, through the two remaining PRB pair #2 804 and #3 805, the DMRS of another terminal may be transmitted, or the DMRS transmission may be turned off. Accordingly, the received DMRS sequence #1 809 is a sequence that is not related to the DMRS sequence preconfigured to terminal #0 (configured DMRS sequence #1 811). Accordingly, the correlation value in PRB pair #0 802 and #1 803 among the correlation values calculated after the correlation operation 820 may have the largest magnitude. In an example as illustrated in FIGS. 8A and 8B, correlation value #0 813 has relatively large value as compared with the correlation value #1 814.

In an embodiment of the present disclosure, terminal #0 may select a bundled PRB pair set that will actually perform the blind decoding based on the calculated magnitude of the correlation value. To determine this, terminal #0 may compare the magnitude of the predetermined threshold value 815 with the magnitude of the calculated correlation value. In an example as illustrated in FIGS. 8A and 8B, correlation value #1 814 has the magnitude that is less than that of the predetermined threshold value 815, and correlation value #0 813 has the magnitude that is greater than that of the predetermined threshold value 815. Accordingly, terminal #0 may assume that the DMRS of terminal #0 itself has been transmitted to PRB pair #0 802 and #1 803 constituting PRB pair set having the correlation value that is greater than the threshold value 815. Since this means that the EPDCCH of terminal #0 has been transmitted to PRB pair #0 802 and #1 803, terminal #0 may perform the blind decoding only with respect to the search space existing in PRB pair #0 802 and #1 803.

Figure 9:
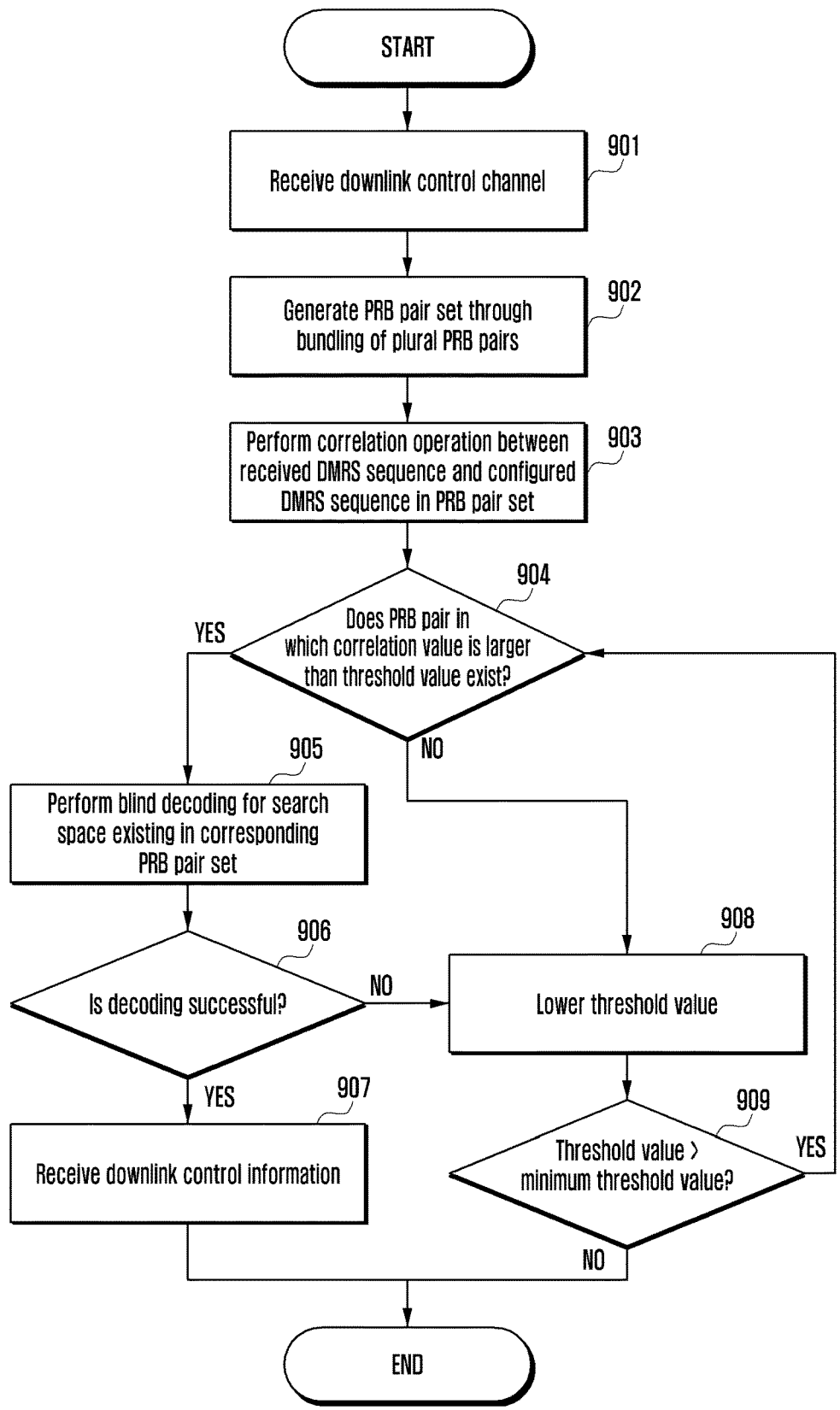
FIG. 9 is a diagram illustrating an operation of a terminal according to an embodiment of the present disclosure.

FIG. 9 is a diagram illustrating an operation of a terminal according to an embodiment of the present disclosure.

Referring to FIG. 9, at operation 901, the terminal may receive a downlink control channel (e.g., EPDCCH set). At operation 902, the terminal may make a PRB pair set by bundling one or more PRB pairs with respect to respective PRB pairs configured as an EPDCCH set. At operation 903, the terminal may perform correlation operation between the received DMRS sequence and the configured DMRS sequence.

At operation 904, the terminal compares the correlation value operated in respective PRB pair sets with a predetermined threshold value, and determines whether there exists a PRB pair set in which the calculated correlation value is greater than the predetermined threshold value. If there is a PRB pair in which the calculated correlation value is greater than the threshold value, the terminal, at operation 905, performs blind decoding for the search space existing in the corresponding PRB pair set.

At operation 906, the terminal determines whether decoding for the EPDCCH has succeeded, and if the decoding has succeeded, the terminal, at operation 907, may receive downlink control information. If the decoding has failed, the terminal proceeds to operation 908 and operates to lower the threshold value.

Thereafter, at operation 909, the terminal may compare a new threshold value with the minimum threshold value. Here, the minimum threshold value means a minimum value of the threshold value that is predetermined as a system parameter.

If it is determined that the threshold value is equal to or less than the minimum threshold value at operation 909, the terminal may directly stop its operation. If it is determined that the threshold value is greater than the minimum threshold value at operation 909, the terminal proceeds to operation 903 to compare again the lowered threshold value with the correlation value operated in the respective PRB pair sets, and may repeatedly perform the subsequent terminal operation. At this time, only in the case where the terminal re-performs the operation 905 after passing through the operation 904 again, the terminal may perform the blind decoding only with respect to newly selected PRB pair sets without performing again the blind decoding with respect to the PRB pair sets for which the blind decoding has been previously performed.

If it is determined that the PRB pair set, in which the correlation value that is greater than the threshold value configured at operation 904 has been calculated, does not exist, the terminal, at operation 908, may control again the threshold value, and the subsequent operation is the same as the operation as described above.

In performing an embodiment and an embodiment of the present disclosure, configuration of the value against the threshold value being used may exert a great influence on the terminal operation and the decoding performance. As an example, there may be a tradeoff between successful acquisition for downlink control channel decoding and power consumption of a terminal in accordance with the magnitude of the threshold value.

More specifically, as the magnitude of the threshold value becomes lower, the probability that the correlation values calculated through the correlation operation is greater than the threshold value becomes higher, and this means that the blind decoding can be performed with respect to the search space in much more PRB pairs.

As a result, as the magnitude of the threshold value is lowered, the probability that the blind decoding is to be performed for the whole search space is heightened, and thus, the probability that the downlink control channel can be successfully acquired is heightened. In contrast, due to the increased number of times of blind decoding, the power consumption of the terminal may be increased. In contrast, as the magnitude of the threshold value becomes larger, the probability that the correlation values calculated through the correlation operation become greater than the threshold value becomes lower, and this means that the blind decoding can be performed for the search space in less PRB pairs. As a result, as the magnitude of the threshold value becomes larger, the probability to perform the blind decoding for a partial search space becomes higher, and thus, the power consumption of the terminal can be reduced through effective reduction of the number of times of blind decoding. In contrast, since the blind decoding is performed only with respect to the partial search space, the probability to successfully acquire the downlink control channel may be lowered.

As described above, in performing an embodiment and an embodiment of the present disclosure, it is very important to configure a suitable threshold value. An optimum threshold value may be calculated based on various system parameters (e.g., wireless link quality, power rate of a terminal, traffic amount, and delay time).

Hereinafter, various embodiments of a method for configuring a threshold value proposed by the present disclosure will be described.

In configuring the threshold value, the threshold value may be differently adjusted in accordance with the wireless link quality. Good wireless link quality may mean that a received signal has a small distortion against a transmitted signal, and thus, if the wireless link quality is good, the RS correlation value obtained through the correlation operation can be measured more accurately.

As the RS correlation value is measured more accurately, better detection of the PRB pair through which the EPDCCH is actually transmitted may be performed even if the threshold value is relatively increased. As a result, it may be more efficient from the viewpoint of the terminal operation and the power consumption to perform the blind decoding only with respect to the partial search space through increasing of the threshold value as the wireless link quality becomes better.

Figure 10:
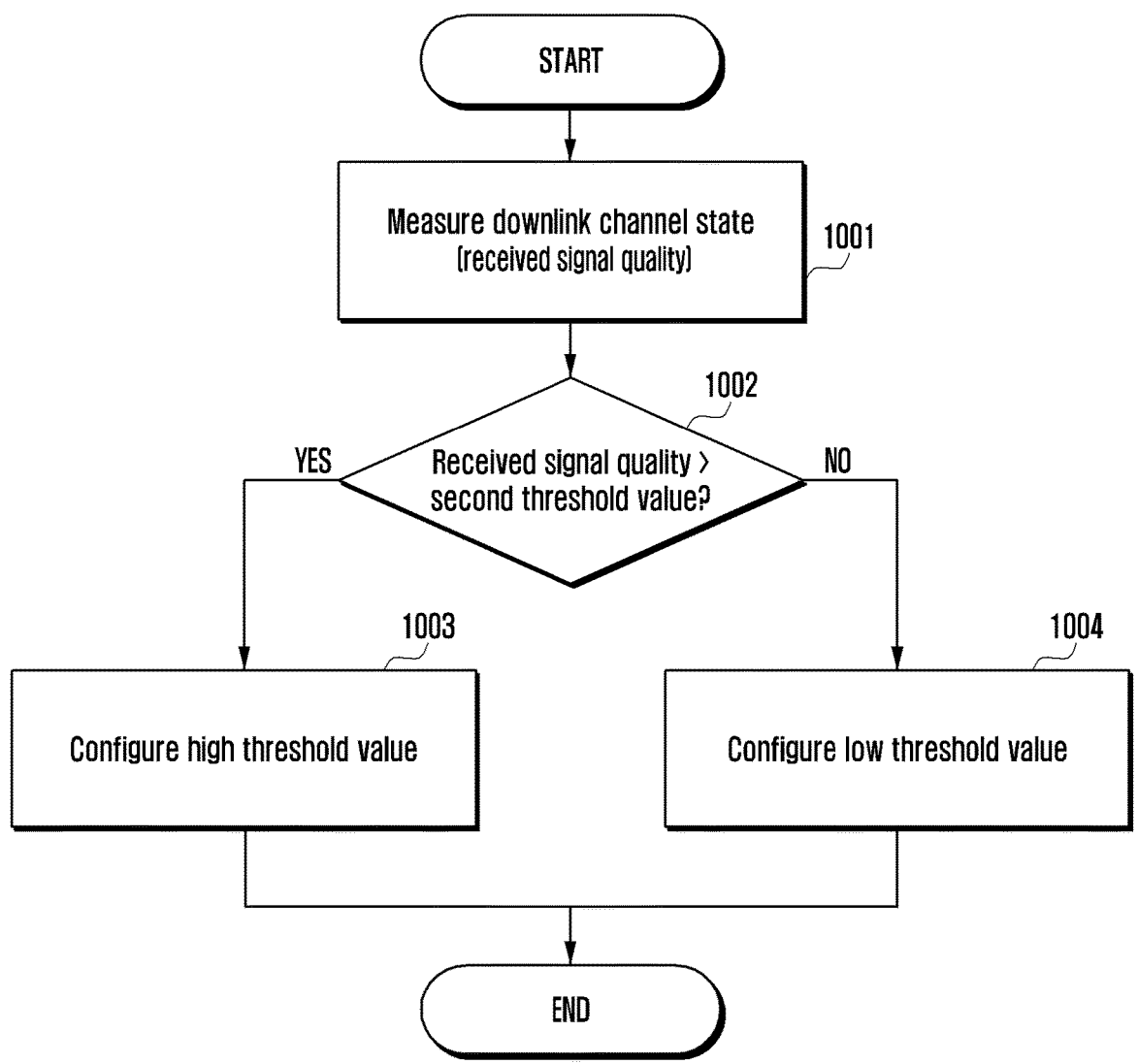
FIG. 10 is a diagram illustrating a method for configuring a threshold value according to an embodiment of the present disclosure.

FIG. 10 is a diagram illustrating a method for configuring a threshold value according to an embodiment of the present disclosure.

Referring to FIG. 10, at operation 1001, the terminal measures the downlink channel state. Here, the downlink channel state may be, for example, a reference signal received power (RSRP), reference signal received quality (RSRQ), or channel quality information (CQI), and the terminal may measure the channel state using a cell-specific reference signal (CRS) or a channel state information reference signal (CSI-RS).

At operation 1002, the terminal may compare the measured received signal quality with the magnitude of the second threshold value. Here, the second threshold value may be defined as a reference value for determining the received signal quality. Specifically, that the received signal quality is greater than the second threshold value may mean that the received signal quality is relatively superior, and that the received signal quality is less than the second threshold value may mean that the received signal quality is relatively bad.

At operation 1002, if the measured received signal quality is greater than the second threshold value, the terminal, at operation 1003, may configure the threshold value used for comparison with the correlation value as a relatively large value. In contrast, if the received signal quality measured at operation 1002 is less than the second threshold value, the terminal, at operation 1004, may configure the threshold value used for comparison with the correlation value according to various embodiments of the present disclosure as a relatively small value.

According to another embodiment of the present disclosure, in a method for configuring the threshold value used in various embodiments of the present disclosure, the threshold value may be differently adjusted in accordance with the battery state of the terminal. The battery state of the terminal may include all states related to the battery, such as battery residual amount, battery heat rate, and battery charging rate. In the present disclosure, the battery residual amount is considered as the battery state, and the same rule may be applied to other battery states.

A power-efficient terminal operation is more preferable in monitoring the downlink control channel as the battery residual amount of the terminal becomes smaller. Accordingly, as the battery residual amount of the terminal becomes smaller, it is efficient to perform the blind decoding for the minimum search space, and for this, it may be preferable to increase the threshold value.

Figure 11:
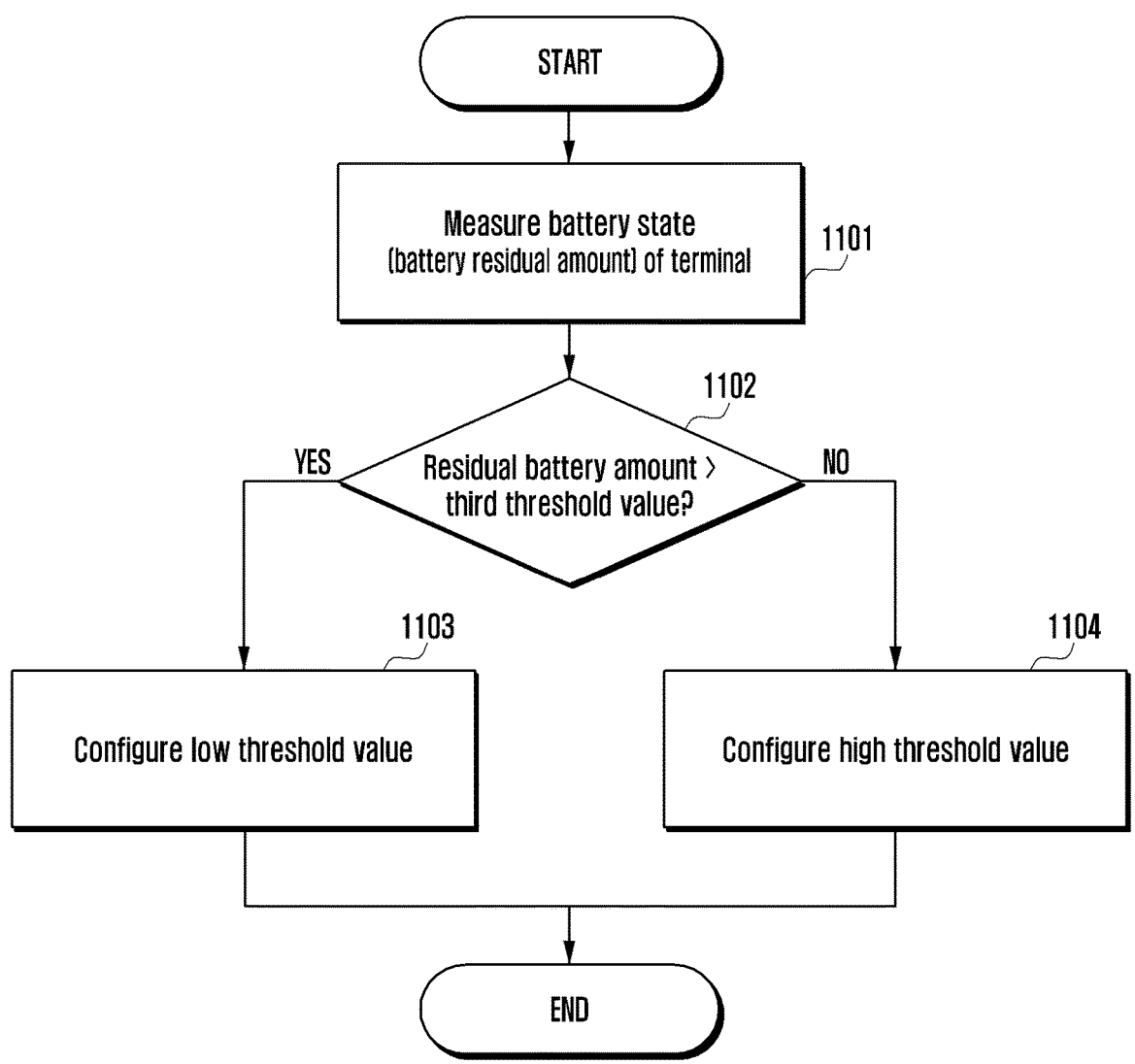
FIG. 11 is a diagram illustrating a method for configuring a threshold value according to an embodiment of the present disclosure.

FIG. 11 is a diagram illustrating a method for configuring a threshold value according to an embodiment of the present disclosure.

Referring to FIG. 11, at operation 1101, the terminal measures the current battery state (e.g., battery residual amount) of the terminal. At operation 1102, the terminal may compare the measured battery residual amount with a predetermined third threshold value. Here, the third threshold value may be defined as a reference value for determining whether the battery residual amount is relatively large or small. Specifically, if the battery residual amount is greater than the third threshold value, it means that the battery residual amount is relatively large, whereas if the battery residual amount is less than the third threshold value, it means that the battery residual amount is relatively small.

If it is determined that the measured battery residual amount is greater than the third threshold value at operation 1102, the terminal, at operation 1103, may configure the threshold value used for the correlation value comparison in the various embodiments of the present disclosure as a relatively small value. In contrast, if the measured battery residual amount is less than the third threshold value at operation 1102, the terminal, at operation 1104, may configure the threshold value used for the correlation value comparison in various embodiments of the present disclosure as a relatively large value.

FIG. 12 is a block diagram of a terminal according to an embodiment of the present disclosure.

Referring to FIG. 12, in order to perform the above-described embodiments of the present disclosure, a terminal processor 1201, a terminal receiver 1202, and a terminal transmitter 1203 are illustrated.

The terminal processor 1201 may control a series of processes for operating the terminal according to the embodiments of the present disclosure as described above. The terminal processor 1201 may be called a controller.

The terminal processor 1201 may differently control the blind decoding for the downlink control channel of the terminal in accordance with threshold value configuration information for determining the RS correlation value according to an embodiment of the present disclosure, search space configuration information, reception channel quality information, and terminal battery amount information.

In an embodiment of the present disclosure, the terminal receiver 1202 and the terminal transmitter 1203 may be commonly called a transceiver. The transceiver may transmit/receive signals to/from the base station. The signals may include control information and data. For this, the transceiver may be composed of an RF transmitter up-converting and amplifying the frequency of the transmitted signal, and an RF receiver low-noise-amplifying the received signal and down-converting the frequency of the received signal. Further, the transceiver may receive the signal through a radio channel, output the received signal to the terminal processor 1201, and transmit the signal output from the terminal processor 1201 through the radio channel.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A decoding method by a user equipment (UE), the method comprising:

receiving a downlink control channel;
receiving a reference signal in respective physical resource block (PRB) pairs;
performing a correlation operation between a first sequence for the reference signal and a second sequence for a predetermined reference signal for decoding the downlink control channel;
comparing a correlation value in accordance with the correlation operation with a first threshold value; and
performing blind decoding of a search space for the downlink control channel in a PRB pair among the PRB pairs based on the correlation value corresponding to the PRB pair being greater than the first threshold value,
wherein the first threshold value is adjusted based on a comparison result of the correlation value and the first threshold value.

2. The method of claim 1, wherein the second sequence is related to a UE-specific sequence configured through higher layer signaling.

3. The method of claim 1, wherein the reference signal for decoding the downlink control channel has a same pattern as that of a reference signal for decoding data transmitted from a base station.

4. The method of claim 1, wherein the performing of the decoding further comprises:
reducing the first threshold value for a predetermined value, if the correlation value in a second PRB pair is equal to or less than the first threshold value in accordance with the result of the comparison;
comparing the correlation value in the second PRB pair with the reduced first threshold value if the reduced first threshold value is greater than a minimum threshold value; and
performing the blind decoding for the search space existing in the second PRB pair if the correlation value is greater than the reduced first threshold value in accordance with the result of the comparison.

5. The method of claim 1, further comprising:
measuring a channel state of a downlink;
comparing a state value in accordance with the result of the measurement with a second threshold value; and
configuring the first threshold value in accordance with the result of the comparison.

6. The method of claim 1, further comprising:
identifying a battery state of the terminal;
comparing a residual battery amount in accordance with the result of the identification with a third threshold value; and
configuring the first threshold value in accordance with the result of the comparison.

7. The method of claim 1, wherein the performing of the correlation operation comprises:
generating a PRB pair set by bundling the PRB pairs; and
performing a correlation operation between the first sequence for the reference signal and the second sequence in the PRB pair set.

8. The method of claim 1, wherein the reference signal comprises a demodulation reference signal (DMRS).

9. The method of claim 1, wherein the downlink control channel comprises an enhanced physical downlink control channel (EPDCCH).

10. A user equipment (UE) for performing decoding, the UE comprising:
a transceiver; and
at least one processor coupled with the transceiver and configured to control to:
receive a downlink control channel,
receive a reference signal in respective physical resource block (PRB) pairs,
perform a correlation operation between a first sequence for the reference signal and a second sequence for a predetermined reference signal for decoding the downlink control channel,
compare a correlation value in accordance with the correlation operation with a first threshold value, and
perform blind decoding of a search space for the downlink control channel in a PRB pair among the PRB pairs based on the correlation value corresponding to the PRB pair being greater than the first threshold value,
wherein the first threshold value is adjusted based on a comparison result of the correlation value and the first threshold value.

11. The UE of claim 10, wherein the second sequence is related to a UE-specific sequence configured through higher layer signaling.

12. The UE of claim 10, wherein the reference signal for decoding the downlink control channel has a same pattern as that of a reference signal for decoding data transmitted from a base station.

13. The UE of claim 10, wherein the at least one processor is further configured to:
reduce the first threshold value for a predetermined value if the correlation value in a second PRB pair is equal to or less than the first threshold value in accordance with the result of the comparison,
compare the correlation value in the second PRB pair with the reduced first threshold value if the reduced first threshold value is greater than a minimum threshold value, and
perform the blind decoding for the search space existing in the second PRB pair if the correlation value is greater than the reduced first threshold value in accordance with the result of the comparison.

14. The UE of claim 10, wherein the at least one processor is further configured to:
measure a channel state of a downlink,
compare a state value in accordance with the result of the measurement with a second threshold value, and
configure the first threshold value in accordance with the result of the comparison.

15. The UE of claim 10, wherein the at least one processor is further configured to:
identify a battery state of the terminal,
compare a residual battery amount in accordance with the result of the confirmation with a third threshold value, and
configure the first threshold value in accordance with the result of the comparison.

16. The UE of claim 10, wherein the at least one processor is further configured to:
generate a PRB pair set by bundling the PRB pairs, and
perform a correlation operation between the first sequence for the reference signal and the second sequence in the PRB pair set.

17. The UE of claim 10, wherein the reference signal comprises a demodulation reference signal (DMRS).

18. The UE of claim 10, wherein the downlink control channel comprises an enhanced physical downlink control channel (EPDCCH).

* * * * *